US012801782B2

(12) United States Patent
Kanwar et al.

(10) Patent No.: US 12,801,782 B2
(45) Date of Patent: Nov. 17, 2026

(54) SYSTEMS AND METHODS FOR SECURE METADATA-DRIVEN DATA MANAGEMENT

(71) Applicant: Reltio, Inc., Redwood Shores, CA (US)

(72) Inventors: Anshuman Kanwar, Cambridge, MA (US); Manish Sood, Seattle, WA (US)

(73) Assignee: Reltio, Inc., Redwood Shores, CA (US)

( * ) Notice: Subject to any disclaimer, the term of this patent is extended or adjusted under 35 U.S.C. 154(b) by 53 days.

(21) Appl. No.: 19/000,450

(22) Filed: Dec. 23, 2024

(65) Prior Publication Data

US 2025/0209203 A1 Jun. 26, 2025

Related U.S. Application Data

(60) Provisional application No. 63/614,566, filed on Dec. 23, 2023.

(51) Int. Cl.
*G06F 21/62* (2013.01)

(52) U.S. Cl.
CPC ................................ *G06F 21/6245* (2013.01)

(58) Field of Classification Search
CPC ................................................... G06F 21/6245
See application file for complete search history.

(56) References Cited

U.S. PATENT DOCUMENTS 10,095,800 B1 * 10/2018 Yalamanchi .......... G06F 16/972
10,541,938 B1 * 1/2020 Timmerman ......... H04L 43/065
12,563,060 B1 * 2/2026 Sobrier ............... G06F 16/9535
2008/0005204 A1 1/2008 Prus
2012/0089572 A1 4/2012 Raichstein
2012/0331284 A1 12/2012 Kouladjie
2015/0365480 A1 12/2015 Soto
(Continued)

OTHER PUBLICATIONS

Search Report and Written Opinion for International Application No. PCT/US2024/061801 dated Mar. 25, 2025.
(Continued)

*Primary Examiner* — Merilyn P Nguyen
(74) *Attorney, Agent, or Firm* — Ahmann Kloke LLP

(57) ABSTRACT

Deploying a multi-tenant computing platform, wherein the multi-tenant computing platform comprises a plurality of different underlying data structures, applications, functions, and back-end services. Defining a unified data model for the multi-tenant computing platform, wherein the unified data model normalizes the plurality of different underlying data structures, applications, functions, and back-end services of the multi-tenant computing platform, and wherein the unified data model defines relationships and dependencies between data types, and wherein at least a portion of the data types are indicated as private by the unified data model. Receiving data management operation metadata from a local area computing environment remote from the multi-tenant computing platform, wherein the data management operation metadata anonymously indicates one or more local data operations of the local area computing environment, the one or more local data operations associated with one or more private data types. Performing, at the multi-tenant computing platform based on the unified data model and the data management operation metadata, one or more data management operations.

10 Claims, 25 Drawing Sheets

(56) References Cited

U.S. PATENT DOCUMENTS

| | | | | |
|---|---|---|---|---|
| 2017/0235466 | A1* | 8/2017 | Tanwir | G06F 3/0481 715/738 |
| 2018/0096165 | A1* | 4/2018 | Warshavsky | G06F 16/2282 |
| 2022/0108026 | A1* | 4/2022 | Ortiz | G06F 12/1408 |
| 2022/0309036 | A1 | 9/2022 | Ballai | |
| 2023/0206329 | A1* | 6/2023 | Cella | G06F 21/6245 |
| 2026/0024037 | A1* | 1/2026 | Mystetskyi | G06Q 10/06316 |

OTHER PUBLICATIONS

International Preliminary Report on Patentability for International Application No. PCT/US2024/061801 dated Jun. 17, 2026.

* cited by examiner

SYSTEMS AND METHODS FOR SECURE METADATA-DRIVEN DATA MANAGEMENT

CROSS-REFERENCE TO RELATED APPLICATIONS

The present application claims priority to U.S. Provisional Patent Application Ser. No. 63/614,566 filed Dec. 23, 2023, which is incorporated by reference herein.

BACKGROUND

Computing systems routinely store and process large amounts of data. Processing such large amounts of data consumes vast amounts of computing resources (e.g., memory, processing speed, network bandwidth, and the like). Moreover, typical computing systems routinely operate on sensitive data, and they cannot efficiently perform data management operations without exposing the sensitive data.

DETAILED DESCRIPTION

Figure 1:
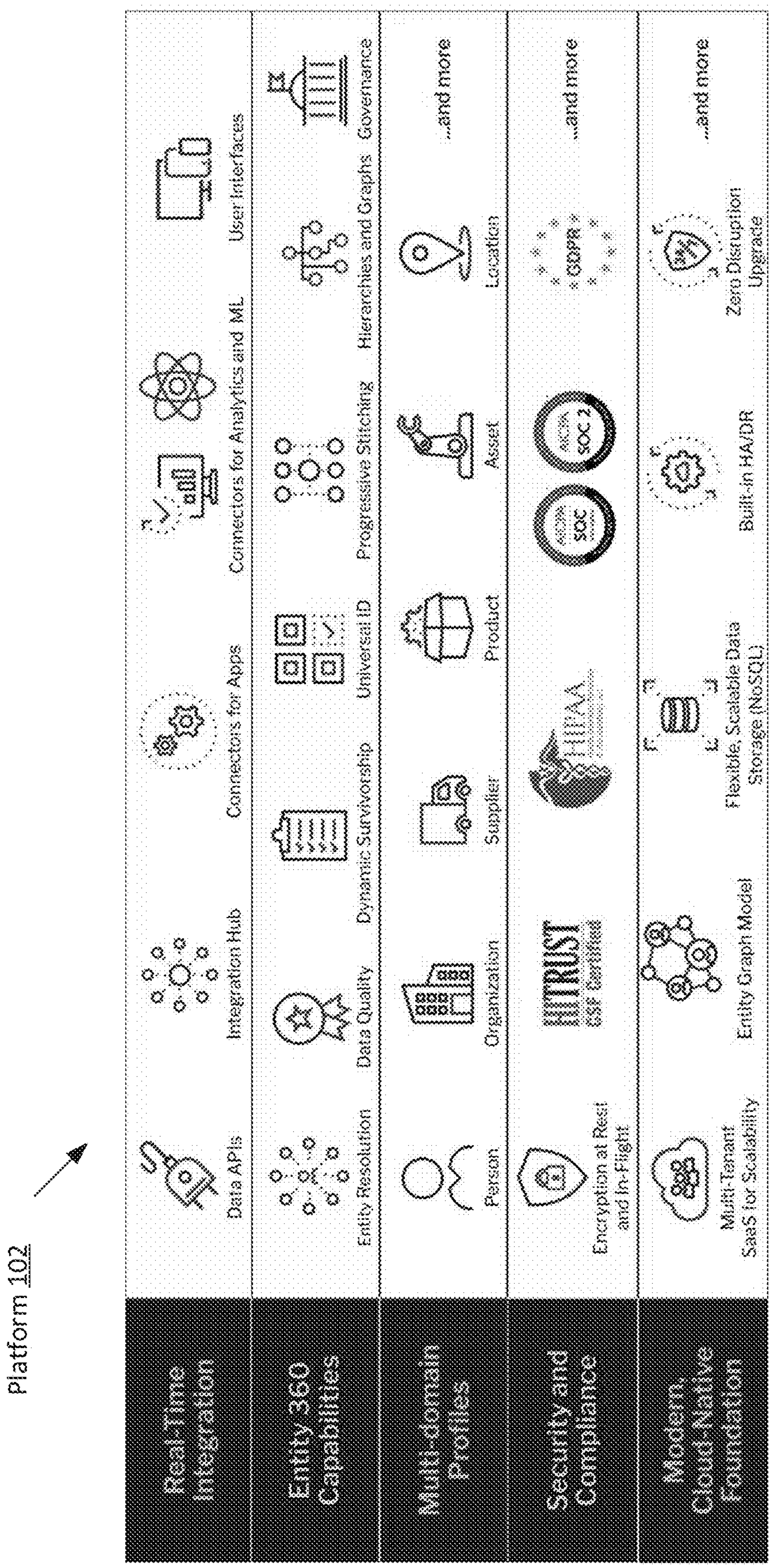
FIG. 1 depicts a connected data platform.

A claimed solution rooted in computer technology overcomes problems specifically arising in the realm of computer technology. In various embodiments, a metadata-driven cloud-based platform efficiently provides secure data management operations without unnecessarily exposing sensitive data. For example, data management operations are often performed in cloud-based environments (e.g., as opposed to local environments). Traditionally, the data is stored in the cloud (e.g., by a third-party provider) which necessarily accesses the data, including sensitive data. However, this can unnecessarily expose such sensitive data (e.g., to third parties). The metadata-driven cloud-based platform can use a unified data model and specific metadata to operate on data in the cloud environment without exposing sensitive data, not even to the metadata-driven cloud-based platform.

In some embodiments, the metadata-driven cloud-based platform is a multi-tenant computing platform that includes a variety of different underlying data structures, applications, functions, and back-end services. The metadata-driven cloud-based platform can define a unified data model that can normalize the different underlying data structures, applications, functions, and back-end services. The unified data model can define relationships and dependencies between data and/or data types (collectively, data) and can indicate whether various data is private (e.g., sensitive) or should be marked as private.

The metadata-driven cloud-based platform can receive specific metadata from a local computing environment that is remote from the metadata-driven cloud-based platform. For example, the local environment may comprise a LAN or WAN of an enterprise organization, and the specific metadata can describe local data operations (e.g., operations of one or more applications executing in the local computing environment). More specifically, local data operations involving private data do not need to be sent to the metadata-driven cloud-based platform for the platform to perform data management operations involving the private data. Rather, the specific metadata can describe the local data operations and/or private data (e.g., identifying data types, fields, identifiers, and the like) which the metadata-driven cloud-based platform can use to perform data management operations (e.g., without knowing the values of the data or otherwise exposing the sensitive data to the metadata-driven cloud-based platform or other systems).

In some embodiments, the metadata-driven cloud-based platform further provides a consistent front-end to users regardless of any changes to the underlying data structures or back-end technology of the platform. Moreover, the metadata-driven cloud-based platform can switch back-end services seamlessly, dynamically, and transparently without the change impacting any of the tenant interactions with the front-end.

In some embodiments, the metadata-driven cloud-based platform can receive inputs and present a consistent single logical view of the plurality of different underlying data structures, applications, functions, and back-end services across multiple tenants of the metadata-driven cloud-based platform regardless of any changes to those underlying data structures, applications, functions, and back-end services. For example, an enterprise user can be associated with multiple tenants of the metadata-driven cloud-based platform. The user can provide the same inputs and the system can present the same logical view of the underlying data structures, applications, functions, and back-end services even of there were intervening changes to those underlying data structures, applications, functions, and back-end services. For example, a user may request to view employees of the enterprise which requires the metadata-driven cloud-based platform to retrieve information from a particular database with a particular database design and/or storage scheme. The unified data model can allow the user to provide the same inputs and be presented with the same logical view even if the database has changed. This can, for example, increase the technical flexibility and computational efficiency of the metadata-driven cloud-based platform.

In some embodiments, each tenant of the metadata-driven cloud-based platform can be associated with some of the data structures (e.g., a subset of the data structures), and the metadata-driven cloud-based platform may be in communication with different back-end service providers (e.g., AWS, Azure, and the like) that each provide storage and/or other back-end services for the tenants of the metadata-driven cloud-based platform. More specifically, the metadata-driven cloud-based platform can provide a unified data model for the metadata-driven cloud-based platform. The unified data model may provide, for each tenant of the platform, a logical view of the subset of data structures associated with that tenant. In some embodiments, an abstraction layer (e.g., of the computing system) maps attributes of each back-end service provider to corresponding attributes of the unified data model.

The abstraction layer can select a storage scheme of a back-end service provider (e.g., AWS) for a particular tenant. The metadata-driven cloud-based platform can receive an input from a tenant, and based on the input, the abstraction layer can translate, based on the mappings, the first input to a set of storage instructions native to the back-end service provider. An execution of the set of storage instructions may cause a resulting logical view of the respective data structures. In some embodiments, the abstraction layer can seamlessly, dynamically, and/or transparently switch the tenant from the storage scheme to another storage scheme of a different back-end service provider (e.g., Azure). The metadata-driven cloud-based platform can receive, from the tenant, another input that is identical to the other input, and translate, based on the mappings, the other input to another set of storage instructions native to the other back-end service provider. An execution of the other set of storage instructions may cause a another resulting logical view of the respective data structures of the particular tenant that is the same as the first logical view (e.g., they may be identical).

In various embodiments, a unique architecture enables efficient modelling of entities, relationships, and interactions that typically form the basis of a business. These models enable insights, scalability, and management not previously available in the prior art. It will be appreciated that with the information model discussed herein, there is no need to consider tables, foreign keys, or any of the low-level physicality of how the data is stored.

An information model (e.g., unified data model) may be utilized as a part of a multi-tenant platform (e.g., metadata-driven cloud-based platform). In a specific implementation, a configuration sits in a layer on top of the RELTIO™ platform and natively enjoys capabilities provided by the platform such as matching, merging, cleansing, standardization, workflow, and so on. Entities established in a tenant may be associated with custom and/or standard interactions of the platform. The ability to hold and link three kinds of data (i.e., entities, relationships, and interactions) in the platform and leverage the confluence of them in one place provides power to model and understanding to a business.

Entities established in a tenant may be associated with custom and/or standard interactions of the platform. The ability to hold and link three kinds of data (i.e., entities, relationships, and interactions) in the platform and leverage the confluence of them in one place provides unlimited power to model and understanding to a business.

In various embodiments, the metadata configuration is based on an n-layer model. One example is a 3-layer model (e.g., which is the default arrangement). In some embodiments, each layer is represented by a JSON file (although it will be appreciated that many different file structures may be utilized such as BSON or YAML).

The information models may be utilized as a part of a connected, multi-tenant system. FIG. 1 depicts a metadata-driven cloud-based platform 102. The metadata-driven cloud-based platform 102 enables seamless scaling in many operational or analytical use case. The metadata-driven cloud-based platform 102 may be the foundation of master data management (MDM). Various integration options, including a low-code/no-code solution, allow rapid deployment and time to value.

FIG. 1 is an example of functions of the metadata-driven cloud-based platform 102 in some embodiments. The metadata-driven cloud-based platform 102 may support best in class MDM capabilities, including identity resolution, data quality, dynamic survivorship for contextual profiles, universal ID across all your operational applications and hierarchies, knowledge graph to manage relationships, progressive stitching to create richer profiles, and governance capabilities. Further, the metadata-driven cloud-based platform 102 may support high volume transactions, high volume API calls, sophisticated analytics, and back-end jobs for any workload in an auto-scaling cloud environment. As follows, the metadata-driven cloud-based platform 102 may support high redundancy, fault tolerance, and availability with built-in NoSQL database, Elasticsearch, Spark, and other AWS and GCP services across multiple zones.

In various embodiments, the metadata-driven cloud-based platform 102 is multi-domain and enables seamless integration of many types of data and from many sources to create master profiles of any data entity-person, organization, product, location. Users can create master profiles for consumers, B2B customers, products, assets, sites, and connect them to see the complete picture.

The metadata-driven cloud-based platform 102 may enable API-first approach to data integration and orchestration. Users (e.g., tenants) can use APIs, and various application-specific connectors to ease integration. Additionally, in some embodiments, users can stream data to analytics or data science platforms for immediate insights.

Figure 2:
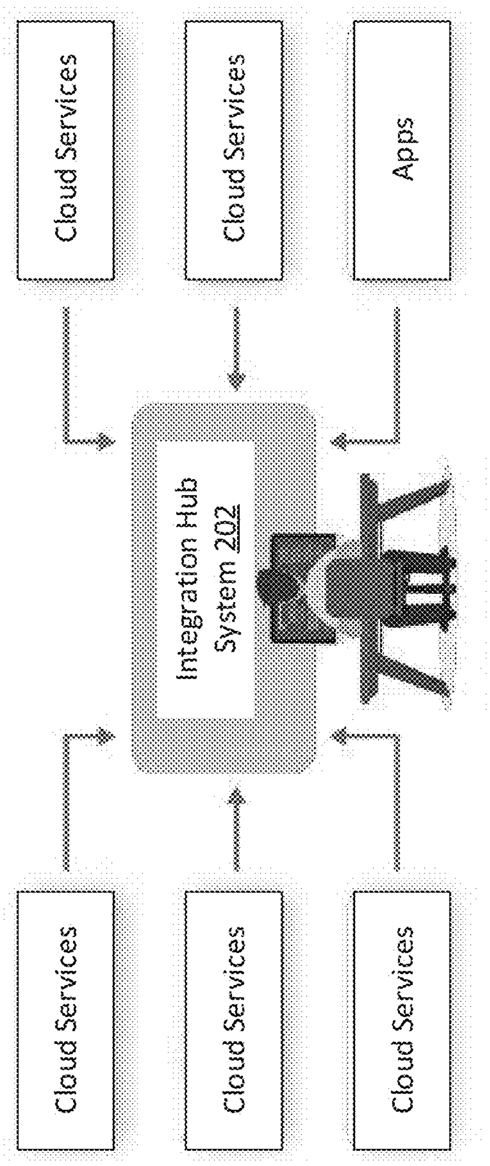
FIG. 2 depicts an environment for an integration hub system.

FIG. 2 depicts an environment for an integration hub system 202. The integration hub system 202 may connect various data sources and downstream consumers. In some embodiments, the integration hub system 202 comes with over 1,000 connectors to build data pipelines right. The integration hub system 202 may include an intuitive drag-and-drop graphical interface to create simple replication pipelines for complex data extraction and transformation tasks. With pre-built community recipes for common use cases, users can set up integration workflows in just a few clicks.

Along with the built-in data loader, event streaming capabilities, data APIs, and partner connectors, the integration hub system 202 enables rapid links to user systems using the metadata-driven cloud-based platform 102. The integration hub system 202 may enable users to build automated workflows to get data to and from the metadata-driven cloud-based platform 102 with any number of SaaS applications in just hours or days. Faster integration enables faster access to unified, trusted data to drive real-time business operations.

Figure 3:
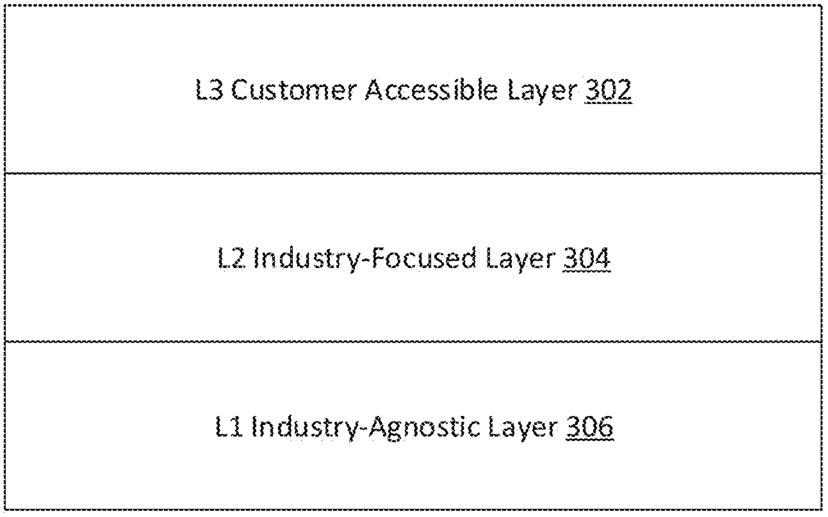
FIG. 3 depicts a three-layer model in some embodiments.

FIG. 3 depicts a three-layer model in some embodiments. Of the three layers, only layer 3 (e.g., the top layer of the n-layer model) 302, known as the "13" is accessible by the customer. It is the layer that is a part of a tenant. The information associated with the L3 layer 302 may be retrieved from the tenant, edited. and applied back to the tenant using Configuration API.

The L3 302 layer typically inherits from the L2 layer 304 (an industry-focused layer) which in turn inherits from the L1 layer 306 (An industry-agnostic layer). Usually, the L3 layer 302 refers to an L2 304 container and inherits all data items (or "objects") from the L2 304 container. However, it is not required that the L3 302 refer to the L2 304 container, it can standalone.

The L2 layer 304 may inherit the objects from the L1 layer. Whereas there is only a single L1 306 set of objects, the objects at the L2 layer 304 may be grouped into industry-specific containers. Like the L1 layer 306, the containers at the L2 layer 304 may be controlled by product management and may not be accessible by customers.

Life sciences is a good example of an L2 layer 304 container. The L2 layer 304 container 304 may inherit the Organization entity type (discussed further herein) from L1 layer 306 and extends it to the Health Care Organization (HCO) type needed in life sciences. As such, the HCO type enjoys all of the attribution and other properties of the Organization type, but defines additional attributes and properties needed by an HCO.

The L1 layer 306 may contain entities such as Party (an abstract type) and Location. In some embodiments, the L1 layer 306 contains a fundamental relationship type called HasAddress that links the Party type to the Location type. The L1 layer 306 also extends the Party type to Organization and Individual (both are non-abstract types).

There may be only one L1 layer 306, and its role is to define industry-agnostic objects that can be inherited and utilized by industry specific layers that sit at the L2 layer 304. This enables enhancement of the objects in the L1 layer 306, potentially affecting all customers. For example, if an additional attribute were added into the HasAddress relationship type, it typically would be available for immediate use by any customer of the platform.

Any object can be defined in any layer. It is the consolidated configuration resulting from the inheritance between the three layers that is commonly referred to as the tenant configuration or metadata configuration. In a specific implementation, metadata configuration consolidates simple, nested, and reference attributes from all the related layers. Values described in the higher layer overrides the values from the lower layers. The number of layers does not affect the inheritance.

In a specific implementation, metadata configuration consolidates simple, nested, and reference attributes from all the related layers. Values described in the higher layer overrides the values from the lower layers. The number of layers does not affect the inheritance.

Figure 4:
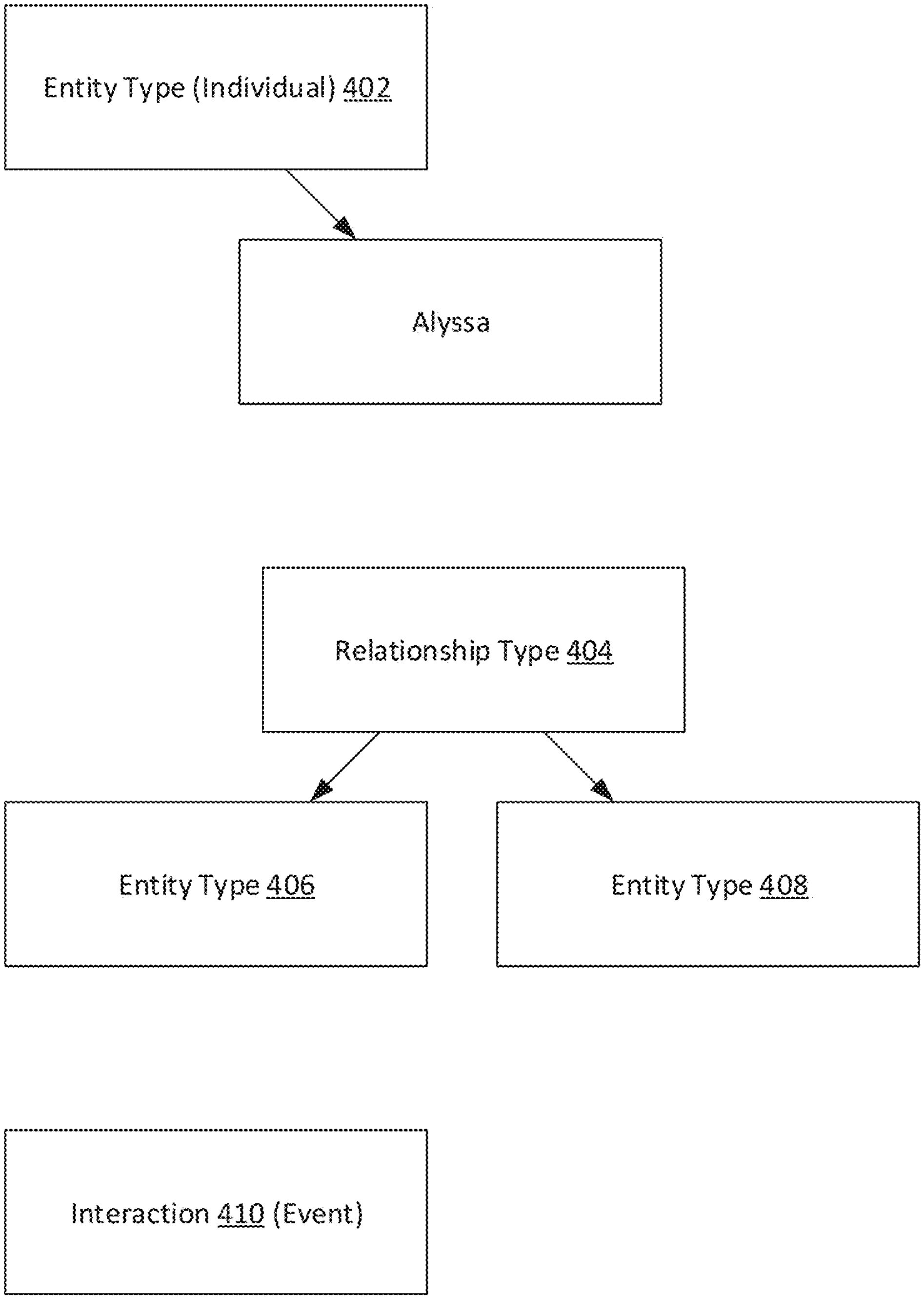
FIG. 4 is a box diagram of some examples of entity type, relationship type and event metadata.

FIG. 4 is a box diagram of some examples of entity type, relationship type and event metadata. The metadata-driven cloud-based platform 102 enables object types entities, relationships, and interactions. The entity type 402 may be a class of entity. For example, "Individual" is an entity type 402, and "Alyssa" represents a specific instance of that entity type. Other common examples of entity types include "Organization," "Location," and "Product."

Often, entity types can materialize in single instances, such as the "Alyssa" example above. In another example, the L1 layer may define the abstract "Party" entity type with a small collection of attributes. The L1 layer may then be configured to define the "Individual" entity type and the "Organization" entity type, both of which inherit from "Party," both of which are non-abstract and both of which add additional attributes specific to their type and business function. Continuing with the concept of inheritance, in the L2 Life Sciences container, the HCP entity may be defined (to represent physicians) which inherits from the "Individual" type but also defines a small collection of attributes unique to the HCP concept. Thus, there is an entity taxonomy "Party," "Individual," or "HCP," and the resulting HCP entity type provides the developer and user with the aggregate attribution of "Party," "Individual," and "HCP."

Once the entity types are defined, the user can link entities together in a data model by using the relationship type. Once the user defines entity types, they can be linked by defining relationships between them. For example, a user can post a relationship independently to link two entities together, or the client can mention a relationship in a JSON, which then posts the relationship and the two entities all at once.

A relationship type 404 describes the links or connections between two specific entities (e.g., entities 406 and 408). A relationship type 404 and the entities 406 and 408 described together form a graph. Some common relationship types are Organization to Organization, Subsidiary Of, Partner Of, Individual to Individual, Parent of/Child Of, Reports To, Individual to Organization/Organization to Individual, Affiliated With, Employee Of/Contractor Of.

Once the user defines entity types, they can be linked by defining relationships between them. For example, a user can post a relationship independently to link two entities together, or the client can mention a relationship in a JSON, which then posts the relationship and the two entities all at once.

The metadata-driven cloud-based platform 102 may enable the user to define metadata properties and attributes for relationship types. The user can define up to any number metadata properties. The user can also define several attributes for a relationship type, such as name, description, direction (undirected, directed, bi-directional), start and end entities, and more. Attributes of one relationship type can inherit attributes from other relationship types.

Hierarchies may be defined through the definition of relationship subtypes. For example, if a user defines "Family" as a relationship type, the user can define "Parent" as a subtype. One hierarchy contains one or many relationship types; all the entities connected by these relationships form a hierarchy. Entity A>HasChild (Entity B)>HasChild (Entity C). Then A, B, and C form a hierarchy. In the same hierarchy, the user can add Subsidiary as a relationship and if Entity D is subsidiary of Entity C, then A, B, C, and D all become part of a single hierarchy.

Interactions 410 are lightweight objects that represent any kind of interaction or transaction. As a broad term, interaction 410 stands for an event that occurs at a particular moment such as a retail purchase or a measurement. It can also represent a fact in a period of time such as a sales figure for the month of June.

Interactions 410 may have multiple actors (entities), and can have varying record lengths, columns, and formats. The data model may be defined using attribute types. As a result, the user can build a logical data model rather than relying on physical tables and foreign keys; define entities, relationships, and interactions in granular detail; make detailed data available to content and interaction designers; provide business users with rich, yet streamlined, search and navigation experiences.

In various embodiments, four manifestations of the attribute type include Simple, Nested, Reference, and Analytic. The simple attribute type represents a single characteristic of an entity, relationship, or interaction. The nested, reference and analytic attribute types represent combinations or collections of simple sub-attribute types.

The nested attribute type is used to create collections of simple attributes. For example, a phone number is a nested attribute. The sub-attributes of a phone number typically include Number, Type, Area code, Extension. In the example of a phone number, the sub-attributes are only meaningful when held together as a collection. When posted as a nested attribute, the entire collection represents a single instance, or value, of the nested attribute. Posts of additional collections are also valid and serve to accumulate additional nested attributes within the entity, relationship or interaction data type.

The reference attribute type facilitates easy definition of relationships between entity types in a data model.

A user may utilize the reference attribute type when they need one entity to make use of the attributes of another entity without natively defining the attributes of both. For example, the L1 layer in the information model defines a relationship that links an Organization and an Individual using the affiliatedwith relationship type. The affiliatedwith relationship type defines the Organization entity type to be a reference attribute of the Individual entity type. This approach to data modeling enables easier navigation between entities and easier refined search.

Easier navigation between entities: In the example of the Organization and Individual entities that are related using the affiliatedwith relationship type, specifying an attribute of previous employer for the Individual entity type enables this attribute to be presented as a hyperlink on the individual's profile facet. From there, the user can navigate easily to the individual's previous employer.

Easily refined search: When attributes of a referenced entity and relationship type are available to be indexed as though they were native to the referencing entity, business users can more easily refine search queries. For example, in a search of a data set that contains 100 John Smith records, entering John Smith in the search box will return 100 John Smith records. Adding Acme to the search criteria will return only those records with John Smith that have a reference, and thus an attribute, that contains the word Acme.

The analytic attribute type is lightweight. In various embodiments, it is not managed in the same way that other attributes are managed when records come together during a merge operation. The analytic attribute type may be used to receive and hold values delivered by an analytics solution.

The user may utilize the analytic attribute type when they want to make a value from your analytics solution, such as Reltio Insights, available to a business user or to other applications using the Reltio Rest API. For example, if an analytics implementation calculates a customer's lifetime value and the user needs that value to be available to the user while they are looking at the customer's profile, the user may define an analytic attribute to hold this value and provide instructions to deliver the result of the calculation to this attribute.

In a specific implementation, the metadata-driven cloud-based platform 102 assigns entity IDs (EIDs) to each item of data that enters the platform. As such, the platform can appropriately be characterized as including an EID assignment engine. Importantly, a lineage-persistent relational database management system (RDBMS) retains the EIDs for each piece of data, even if the data is merged and/or assigned a new EID. As such, the platform can appropriately be characterized as including a legacy EID retention engine, which has the task of ensuring when new EIDs are assigned, legacy EIDs are retained in a legacy EID datastore. The legacy EID retention engine can at least conceptually be divided into a legacy EID survivorship subengine responsible for retaining all EIDs that are not promoted to primary EID as legacy EIDs and a lineage EID promotion subengine responsible for promoting an EID of a first data item merged with a second data item to primary EID of the merged data item. An engine responsible for changing data items, including merging and unmerging (previously merged) data items can be characterized as a data item update engine. Cross-tenant durability also becomes possible when legacy EIDs are retained. In a specific implementation, a cross-tenant durable EID lineage-persistent RDBMS has an n-Layer architecture, such as a 3-Layer architecture.

Data may come from multiple sources. The process of receiving data items can be referred to as "onboarding" and, as such, the metadata-driven cloud-based platform 102 can be characterized as including a new dataset onboarding engine. Each data source is registered and, in a specific implementation, all data that is ultimately loaded into a tenant will be associated with a data source. If no source is specified when creating a data item (or "object"), the source may have a default value. As such, the platform can be characterized as including an object registration engine that registers data items in association with their source.

A crosswalk can represent a data provider or a non-data provider. Data providers supply attribute values for an object and the attributes are associated with the crosswalk. Non-data providers are associated with an overall entity (or relationship); it may be used to link an L1 (or L2) object with an object in another system. Crosswalks do not necessarily just apply to the entity level; each supplied attribute can be associated with data provider crosswalks. Crosswalks are analogous to the Primary Key or Unique Identifier in the RDBMS industry.

The engines and datastores of the metadata-driven cloud-based platform 102 can be connected using a computer-readable medium (CRM). A CRM is intended to represent a computer system or network of computer systems. A "computer system," as used herein, may include or be implemented as a specific purpose computer system for carrying out the functionalities described in this paper. In general, a computer system will include a processor, memory, non-volatile storage, and an interface. A typical computer system will usually include at least a processor, memory, and a device (e.g., a bus) coupling the memory to the processor. The processor can be, for example, a general-purpose central processing unit (CPU), such as a microprocessor, or a special-purpose processor, such as a microcontroller.

Memory of a computer system includes, by way of example but not limitation, random access memory (RAM), such as dynamic RAM (DRAM) and static RAM (SRAM). The memory can be local, remote, or distributed. Non-volatile storage is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. During execution of software, some of this data is often written, by a direct memory access process, into memory by way of a bus coupled to non-volatile storage. Non-volatile storage can be local, remote, or distributed, but is optional because systems can be created with all applicable data available in memory.

Software in a computer system is typically stored in non-volatile storage. Indeed, for large programs, it may not even be possible to store the entire program in memory. For software to run, if necessary, it is moved to a computer-readable location appropriate for processing, and for illustrative purposes in this paper, that location is referred to as memory. Even when software is moved to memory for execution, a processor will typically make use of hardware registers to store values associated with the software, and a local cache that, ideally, serves to speed up execution. As used herein, a software program is assumed to be stored at an applicable known or convenient location (from non-volatile storage to hardware registers) when the software program is referred to as "implemented in a computer-readable storage medium." A processor is considered "configured to execute a program" when at least one value associated with the program is stored in a register readable by the processor.

In one example of operation, a computer system can be controlled by operating system software, which is a software program that includes a file management system, such as a disk operating system. One example of operating system software with associated file management system software is the family of operating systems known as Windows from Microsoft Corporation of Redmond, Wash., and their associated file management systems. Another example of operating system software with its associated file management system software is the Linux operating system and its associated file management system. The file management system is typically stored in the non-volatile storage and causes the processor to execute the various acts required by the operating system to input and output data and to store data in the memory, including storing files on the non-volatile storage.

The bus of a computer system can couple a processor to an interface. Interfaces facilitate the coupling of devices and computer systems. Interfaces can be for input and/or output (I/O) devices, modems, or networks. I/O devices can include, by way of example but not limitation, a keyboard, a mouse or other pointing device, disk drives, printers, a scanner, and other I/O devices, including a display device. Display devices can include, by way of example but not limitation, a cathode ray tube (CRT), liquid crystal display (LCD), or some other applicable known or convenient display device. Modems can include, by way of example but not limitation, an analog modem, an IDSN modem, a cable modem, and other modems. Network interfaces can include, by way of example but not limitation, a token ring interface, a satellite transmission interface (e.g., "direct PC"), or other network interface for coupling a first computer system to a second computer system. An interface can be considered part of a device or computer system.

Computer systems can be compatible with or implemented as part of or through a cloud-based computing system. As used in this paper, a cloud-based computing system is a system that provides virtualized computing resources, software and/or information to client devices. The computing resources, software and/or information can be virtualized by maintaining centralized services and resources that the edge devices can access over a communication interface, such as a network. "Cloud" may be a marketing term and for the purposes of this paper can include any of the networks described herein. The cloud-based computing system can involve a subscription for services or use a utility pricing model. Users can access the protocols of the cloud-based computing system through a web browser or other container application located on their client device.

A computer system can be implemented as an engine, as part of an engine, or through multiple engines. As used in this paper, an engine includes at least two components: 1) a dedicated or shared processor or a portion thereof; 2) hardware, firmware, and/or software modules executed by the processor. A portion of one or more processors can include some portion of hardware less than all of the hardware comprising any given one or more processors, such as a subset of registers, the portion of the processor dedicated to one or more threads of a multi-threaded processor, a time slice during which the processor is wholly or partially dedicated to carrying out part of the engine's functionality, or the like. As such, a first engine and a second engine can have one or more dedicated processors, or a first engine and a second engine can share one or more processors with one another or other engines. Depending upon implementation-specific or other considerations, an engine can be centralized, or its functionality distributed. An engine can include hardware, firmware, or software embodied in a computer-readable medium for execution by the processor. The processor transforms data into new data using implemented data structures and methods, such as is described with reference to the figures in this paper.

The engines described in this paper, or the engines through which the systems and devices described in this paper can be implemented as cloud-based engines. As used in this paper, a cloud-based engine is an engine that can run applications and/or functionalities using a cloud-based computing system. All or portions of the applications and/or functionalities can be distributed across multiple computing devices and need not be restricted to only one computing device. In some embodiments, the cloud-based engines can execute functionalities and/or modules that end users access through a web browser or container application without having the functionalities and/or modules installed locally on the end-users' computing devices.

As used in this paper, datastores are intended to include repositories having any applicable organization of data, including tables, comma-separated values (CSV) files, traditional databases (e.g., SQL), or other applicable known or convenient organizational formats. Datastores can be implemented, for example, as software embodied in a physical computer-readable medium on a general- or specific-purpose machine, in firmware, in hardware, in a combination thereof, or in an applicable known or convenient device or system. Datastore-associated components, such as database interfaces, can be considered "part of" a datastore, part of some other system component, or a combination thereof, though the physical location and other characteristics of datastore-associated components is not critical for an understanding of the techniques described in this paper.

Datastores can include data structures. As used in this paper, a data structure is associated with a way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus, some data structures are based on computing the addresses of data items with arithmetic operations, while other data structures are based on storing addresses of data items within the structure itself. Many data structures use both principles, sometimes combined in non-trivial ways. The implementation of a data structure usually entails writing a set of procedures that create and manipulate instances of that structure. The datastores, described in this paper, can be cloud-based datastores. A cloud based datastore is a datastore that is compatible with cloud-based computing systems and engines.

Assuming a CRM includes a network, the network can be an applicable communications network, such as the Internet or an infrastructure network. The term "Internet" as used in this paper refers to a network of networks that use certain protocols, such as the TCP/IP protocol, and possibly other protocols, such as the hypertext transfer protocol (HTTP) for hypertext markup language (HTML) documents that make up the World Wide Web ("the web"). More generally, a network can include, for example, a wide area network (WAN), metropolitan area network (MAN), campus area network (CAN), or local area network (LAN), but the network could at least theoretically be of an applicable size or characterized in some other fashion (e.g., personal area network (PAN) or home area network (HAN), to name a couple of alternatives). Networks can include enterprise private networks and virtual private networks (collectively, private networks). As the name suggests, private networks are under the control of a single entity. Private networks can include a head office and optional regional offices (collectively, offices). Many offices enable remote users to connect to the private network offices via some other network, such as the Internet.

Matching is a powerful area of functionality and can be leveraged in various ways to support different needs. The classic scenario is that of matching and merging entities (Profiles). Within the architecture discussed herein, relationships that link entities can also and often do match and merge into a single relationship. This may occur automatically and is discussed herein.

Matching can be used on profiles within a tenant to deduplicate them. It can be used externally from the tenant on records in a file to identify records within that file that match to profiles within a tenant. Matching may also be used to match profiles stored within a Data Tenant to those within a tenant.

Figure 5:
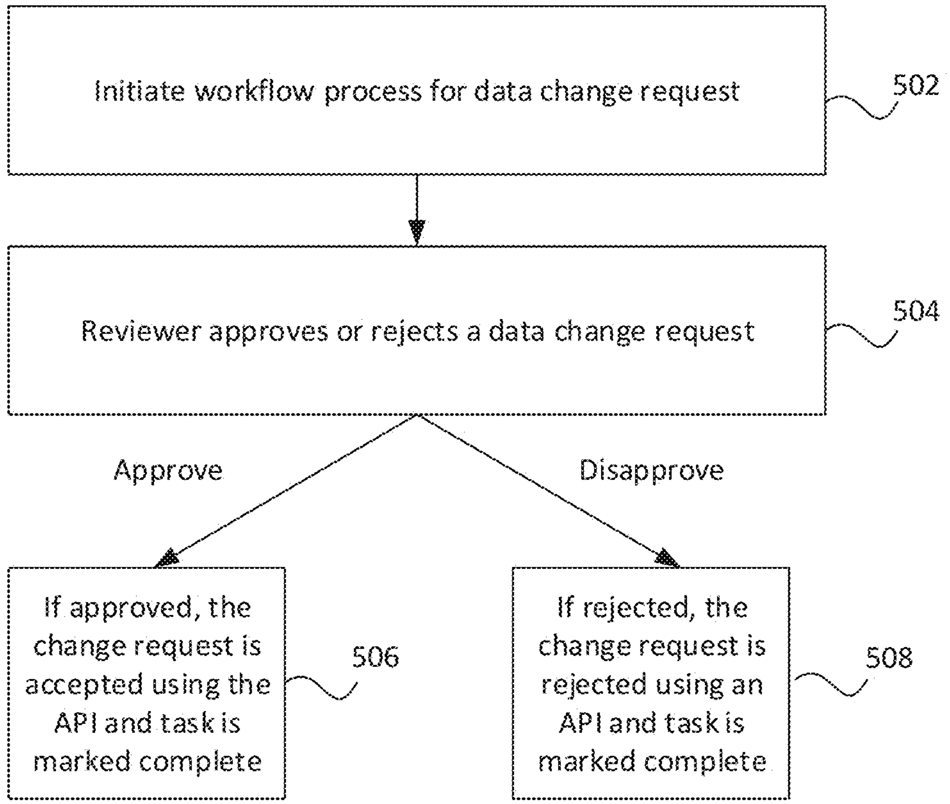
FIG. 5 depicts a dynamic matching facilitation flowchart.

FIG. 5 depicts a dynamic matching facilitation flowchart. The match architecture is responsible for identifying profiles within the tenant that are considered to be semantically the same or similar. A user may establish a match scheme using the match configuration framework. In some embodiments, the user may utilize machine learning techniques to match profiles. In step 502, the user may create match rules. In step 504, the user may identify the attributes from entity types they wish to use for matching. In step 506, the user may write a comparison formula within each match rule which is responsible for doing the actual work of comparing one profile to another. In step 508, the user may map token generator classes that will be responsible for creating match candidates.

Unlike other systems, in various embodiments, the architecture is designed to operate in real-time. Prior to the match process and merge processes occurring, every profile created or updated is may be cleansed on-the-fly by the profile-level cleansers. Thus the 3-step sequence of cleanse, match, merge may be designed to all occur in real-time anytime a profile is created or updated. This behavior makes the metadata-driven cloud-based platform 102 ideal for real-time operational use within a customer's ecosystem.

Lastly, the survivorship architecture is responsible for creating the classic "golden record", but in a specific implementation, it is a view, materialized on-the-fly. It is returned to any API call fetching the profile and contains a set of "Operational Values" from the profile, which are selected in real-time based on survivorship rules defined for the entity type.

In various embodiments, matching may operate continuously and in real-time. For example, when a user creates or updates a record in the tenant, the platform cleanses and processes the record to find matches within the existing set of records.

Each entity type (e.g., contact, organization, product) may have its own set of match groups. In some embodiments, each match group holds a single rule along with other properties that dictate the behavior of the rule within that group. Comparison Operators (e.g., Exact, ExactOrNull, and Fuzzy) and attributes may comprise a single rule.

Match tokens may be utilized to help the match engine quickly find candidate match values. A comparison formula within a match rule may be used to adjudicate a candidate match pair and will evaluate to true or false (or a score if matching is based on relevance).

In some embodiments, the matching function may do one of three things with a pair of records: Nothing (if the comparison formula determines that there is no match); Issue a directive to merge the pair; Issue a directive to queue the pair for review by a data steward. In some embodiments, the architecture may include the following:

1) Entities and relationships each have configurable attribution capability.

2) Values found in an attribute are associated with a crosswalk held within an entity or relationship object. Each profile can have multiple crosswalks, each contributing one or more values. Data may come from multiple sources. Each source may be registered, and all data loaded into a tenant will be associated with a data source. Each supplied attribute may be associated with data provider crosswalks. Crosswalks are analogous to the Primary Key or Unique Identifier in relational database management system (RDBMS). A crosswalk can represent a data provider or a non-data provider.

3) Data providers supply attribute values for an object and the attributes are associated with the crosswalk.

4) Non-data providers are associated with an overall entity (or relationship). In this case it is simply used to link a Reltio object with an object in another system. Supplied attributes may NOT be associated with this crosswalk.

5) Profiles can be matched and merged, but relationships are also matched and merged. While the user may develop match rules to govern the matching and merging of profiles, merging of relationships is automatic and intrinsic to the platform. Any two relationships of the same type, that each have entity A at one endpoint and entity B at their other endpoint, will merge automatically.

6) An attribute is intrinsically multi-valued, meaning it can hold multiple values. This means any attribute can collect and store multiple values from contributing sources or through merging of additional crosswalks. Thus, if a match rule utilizes the first name attribute, then the match engine will by default, compare all values held within the first name attribute of record A to all values held within the first name attribute of record B, looking for matches among the values. The user may elect to only match on operational values if desired.

7) When two profiles merge, the resulting profile contains the aggregate of all the crosswalks of the two contributing profiles and thus the associated attributes and values from those crosswalks. The arrays behind the attributes naturally merge as well, producing for each attribute an array that holds the aggregation of all the values from the contributing attributes. Relationships benefit from the same architecture and behave in the same manner as described for merged entities. The surviving entity ID (or relationship ID) for the merged profile (or relationship) is that of the oldest of the two contributors. Other than that, there really isn't a concept of a winner object and a loser object.

8) When two profiles merge the resulting profile contains references to all the interactions that were previously associated with the contributing profiles. (Note that Interactions do not reference relationships.)

9) If profile B is unmerged from the previous merge of A and B, then B will be reinstated with its original entity ID. All of the attributes (and associated values), relationships, and interactions profile B brought into the merged profile will be removed from the merged profile and returned to profile B.

The matchGroups construct is a collection of match groups with rules and operators that are needed for proper matching. If the user needs to enable matching for a specific entity type in a tenant, then the user may include the matchGroups section within the definition of the entity type in the metadata configuration of the tenant. The matchGroups section will contain one or more match groups, each containing a single rule and other elements that support the rule.

Looking at a match group in a JSON editor, the user can easily see the high-level, classic elements within it. The rule may define a Boolean formula (see the and operator that anchors the Boolean formula in this example) for evaluating the similarity of a pair of profiles given to the match group for evaluation. It is also within the rule element that four other very common elements may be held: ignoreInToken (optional), Cleanse (optional), matchTokenClasses (required), and comparatorClasses (required). The remaining elements that are visible (URI, label, and so on), and some not shown in the snapshot, surround the rule and provide additional declarations that affect the behavior of the group and in essence, the rule.

Each match group may be designated to be one of four types: automatic, suspect, <custom>, and relevance_based described below. The type the user selects may govern whether the user develops a Boolean expression for the comparison rule or an arithmetic expression. The types are described below.

Behavior of the automatic type: With this setting for type, the comparison formula is purely Boolean and if it evaluates to TRUE, the match group will issue a directive of merge which, unless overridden through precedence, will cause the candidate pair to merge.

Behavior of the suspect type: With this setting for type, the comparison formula is purely Boolean and if it evaluates to TRUE, the match group will issue a directive of queue for review which, unless overridden through precedence, will cause the candidate pair to appear in the "Potential Matches View" of the MDM UI.

Behavior of the relevance_based type: Unlike the preceding rules, all of which are based on a Boolean construction of the rule formula, the relevance-based type expects the user to define an arithmetic scoring algorithm. The range of the match score determines whether to merge records automatically or create potential matches.

If a negativeRule exists in the matchGroups and it evaluates to true, any merge directives from the other rules are demoted to queue for review. Thus, in that circumstance, no automatic merges will occur. The Scope parameter of a match group defines whether the rule should be used for Internal Matching or External Matching or both. External matching occurs in a non-invasive manner and the results of the match job are written to an output file for the user to review. Values for Scope are: ALL-Match group is enabled for internal and external matching (Default setting). NONE-Matching is disabled for the match group. INTERNAL-Match group is enabled for matching records within the tenant only. EXTERNAL-Match group is enabled only for matching of records from an external file to records within the tenant; in a specific implementation, external matching is supported programmatically via an External Match API and available through an External Match Application found within a console, such as a RELTIO™ Console.

If set to true, then only the OV of each attribute will be used for tokenization and for comparisons. For example, if the First Name attribute contains "Bill", "William", "Billy", but "William" is the OV, then only "William" will be considered by the cleanse, token, and comparator classes.

The rule is the primary component within the match group. It contains the following key elements each described in detail: Ignore In Token, Cleanse, matchTokenClasses, comparatorClasses, Comparison formula.

A negative rule allows a user to prevent any other rule from merging records. A match group can have a rule or a negative rule. The negative rule has the same architecture as a rule but has the special behavior that if it evaluates to true, it will demote any directive of merge coming from another match group to queue for review. To be sure, most match groups across most customers' configurations use a rule for most matching goals. But in some situations, it can be advantageous to additionally dedicate one or more match groups to supporting a negative rule for the purpose of stopping a merge based on usually a single condition. And when the condition is met, the negative rule prevents any other rule from merging the records. So in practice, the user might have seven match groups each of which use a rule, while the eighth group uses a negative rule.

The metadata-driven cloud-based platform 102 may include a mechanism to proactively monitor match rules in tenants across all environments. In some embodiments, after data is loaded into the tenant, the proactive monitoring system inspects every rule in the tenant over a period of time and the findings are recorded. Based on the percentage of entities failing the inspections, the proactive monitoring system detects and bypasses match rules that might cause performance issues and the client may be will be notified. The bypassed match rules will not participate in the matching process.

In various embodiments, the user receives a notification when the proactive monitoring system detects a match rule that needs review. ScoreStandalone and scoreIncremental elements may be used to calculate a Match Score for a profile that is designated as a potential match and can assist a data steward when reviewing potential matches.

Relevance-based matching is designed primarily as a replacement of the strategy that uses automatic and suspect rule types. With Relevance-based matching, the client may create a scoring algorithm of the user's own design. The advantage is that in most cases, a strategy based on Relevance-based matching can reduce the complexity and overall number of rules. The reason for this is that the two directives of merge and queue for review which normally require separate rules (automatic and suspect respectively) can often be represented by a single Relevance-Based rule.

A workflow is a series of sequential steps or tasks that are carried out based on user-defined rules or conditions to execute a business process. The Workflow may allow a user to manage complex business processes through a series of predetermined steps or tasks. The metadata-driven cloud-based platform 102 may utilize the workflow to enable processes and tasks management, including the assignment and tracking of the tasks. A workflow process may support a creator, a create date, a due date, an assignee, steps, and comments. In various embodiments, workflow business processes are configurable. In some embodiments, the various actors and triggers in a workflow are Actors: The people and processes that participate in the workflow are the actors, e.g., Reviewer, Workflow Engine, Hub, and API; Reviewer: The user will be assigned with the role ROLE_REVIEWER; Trigger: It is a scheduled process that scans activity logs to initiate a review workflow, e.g., from the UI, you can start a Data Change Request workflow to review the updates or the changes to the entities or the profiles data in your tenant. The workflow feature may allow a user to manage business processes through a series of predetermined steps or tasks which enables you to plan and coordinate user tasks, validations, reviews, and approvals for multiple records.

Data Change Request (DCR) is a collection of suggested data changes. Users who do not have rights to update objects, such as the customer sales representatives, can suggest changes. These suggested changes will be accumulated in Data Change Requests queued for review and approval by people with approval privileges, such as the data stewards. Examples of suggested data changes include adding a new attribute value, updating an attribute value, deleting an attribute value, and creating a new object along with referenced objects. Data Change Requests can be initiated using web browser-based user interface for Desktop or Mobile. An example of a step can be a user task assigned to users for Review and Approval of the data change request. In this example, a Workflow for a Data Change Request (DCR) includes the following sequence of steps in the flowchart of FIG. 5.

In step 502, on the profile page in Hub, users can initiate the DCR workflow process in the Suggesting mode.

In step 504, the Reviewer can Approve or Reject the DCR. In the Data Change Request Review pane of the UI, sub-attributes within the nested, reference, or complex attributes, and parent-nested attributes, have a label of the attribute value.

In step 506, if the Reviewer approves the DCR, the change request is accepted using the API and the task is marked complete.

In alternative step 508, if the Reviewer rejects the DCR, the change request is rejected using the API and the task is marked complete. In the Inbox, you have the option of partially rejecting changes from a DCR. In various embodiments, a reviewer may selectively reject attributes and approve a DCR partially.

Figure 6:
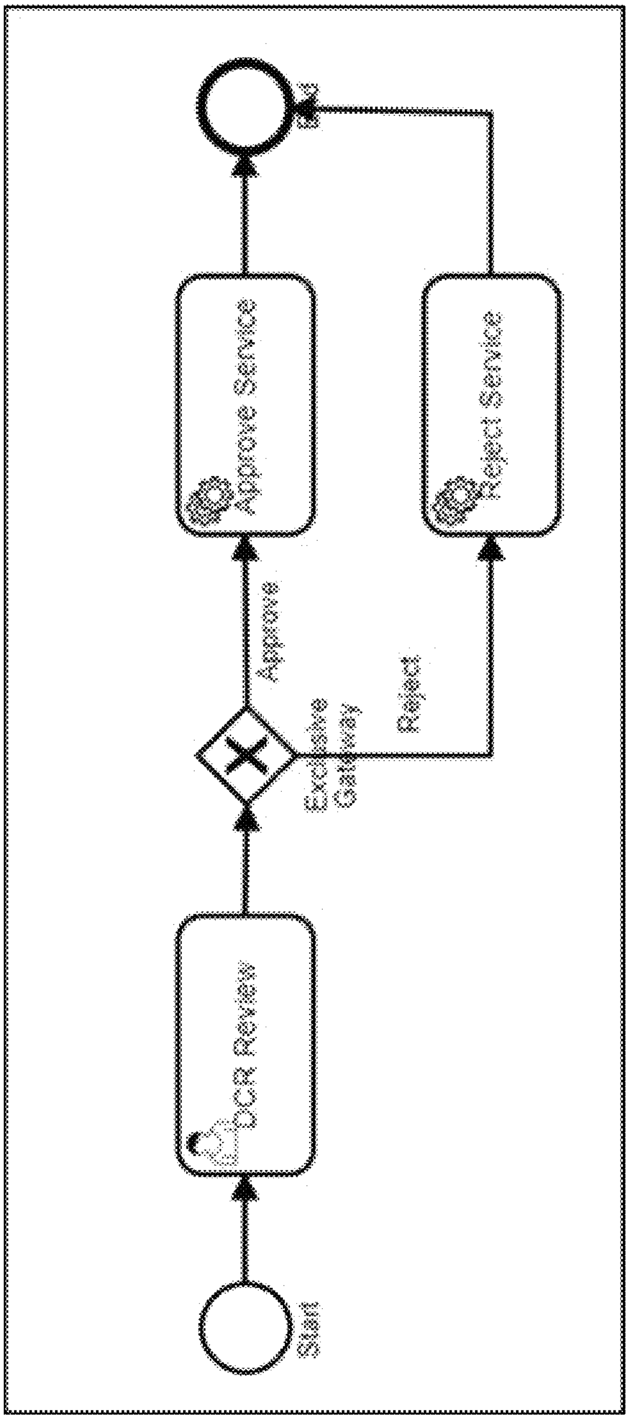
FIG. 6 depicts a graphical diagram of the data change request (DCR) workflow review process of FIG. 5.

FIG. 6 depicts a graphical diagram of the data change request (DCR) workflow review process of FIG. 5.

From a business user's perspective, a workflow may be initiated (manually or automatically) for one or multiple profiles. As a user assigned to the task, the approver can either review the proposed changes or enter a comment.

Figure 7:
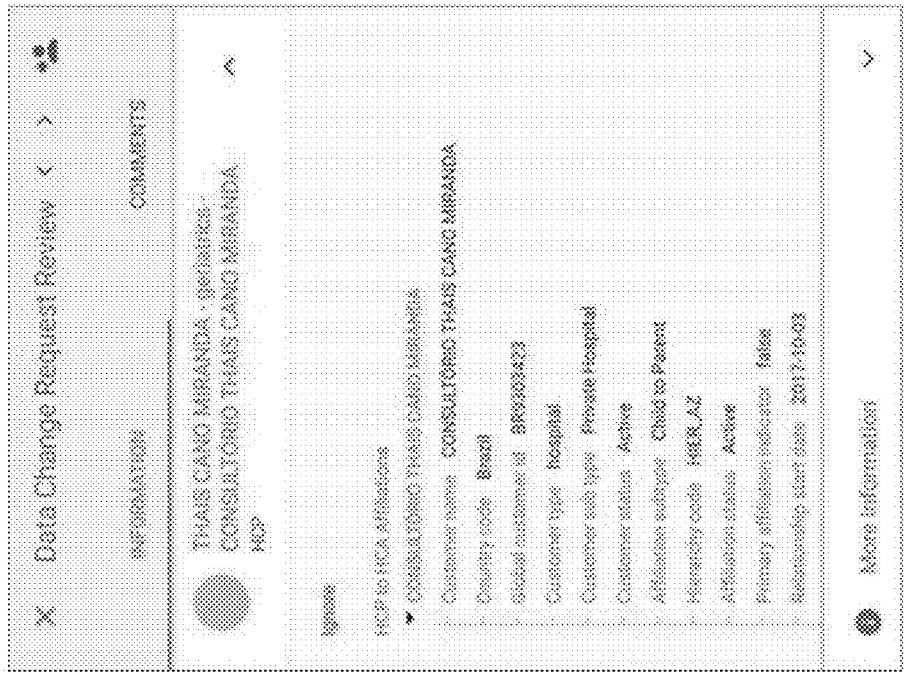
FIGS. 7 and 8 are examples of data change request review panes for a user interface (UI).
Figure 8:
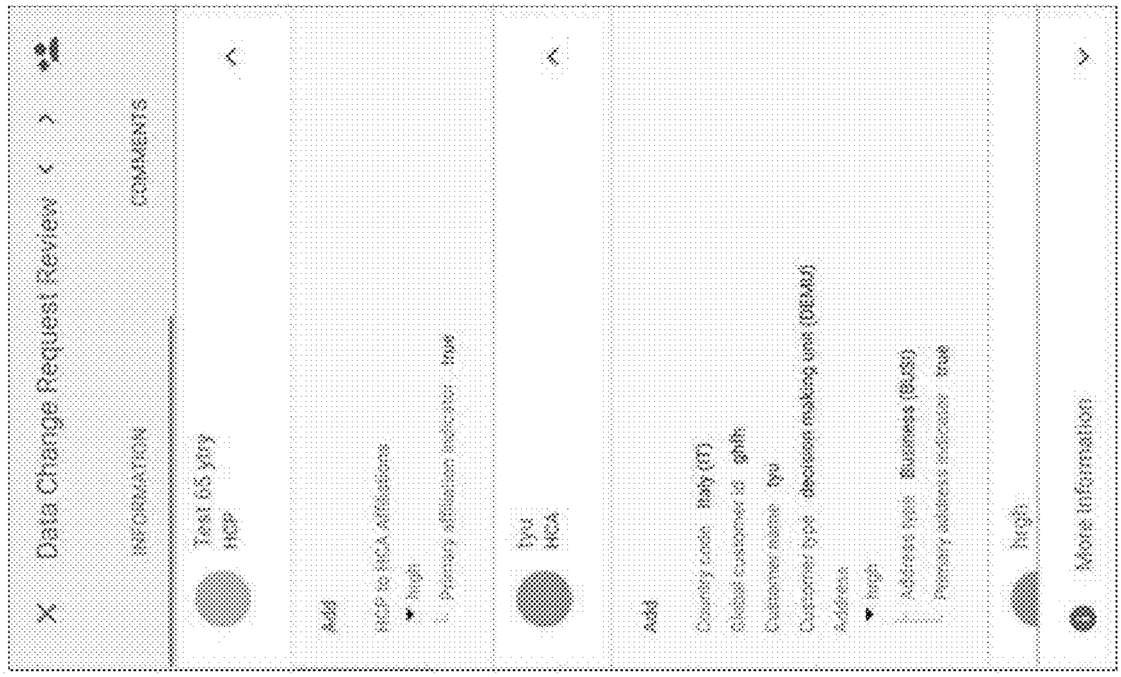

FIG. 7 is an example data change request review pane for the UI in some embodiments. FIG. 8 is another example data change request review pane for the UI in some embodiments. In the example Data Change Request Review pane, sub-attributes within the nested, reference, or complex attributes, and parent-nested attributes, have a label of the attribute value, as shown in these examples.

Figure 9:
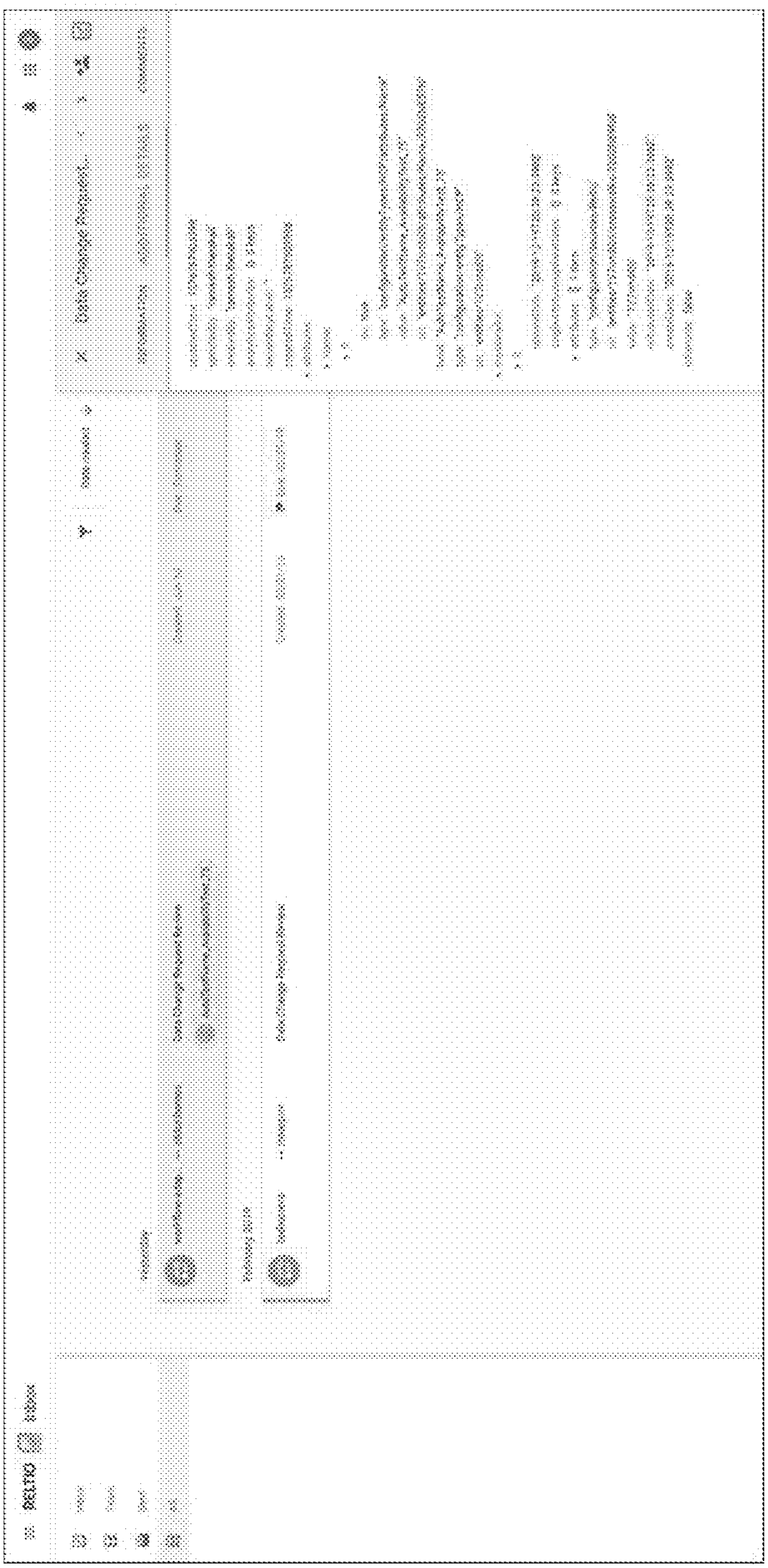
FIG. 9 depicts an additional details tab in the data change request review pane.

To ensure that data stewards can make an informed decision about approving or rejecting a DCR, the ADDITIONAL DETAILS tab is available in the Data Change Request Review panel. FIG. 9 depicts an additional details tab in the data change request review panel in some embodiments. The ADDITIONAL DETAILS tab shows external information of a DCR related to an active task stored by the users. This can be any information that can help the data stewards during the approval process. This external information may be available in the JSON format.

Partial reject may be automatically enabled for users who have the DELETE permission on the MDM:data.changeRequests role. Out-of-the-box workflow processes work with system role ROLE_REVIEWER, which does not have this permission. Therefore, existing customers may have this feature enabled automatically depending on permissions they have assigned to data stewards (workflow reviewers). Otherwise, customers must enable partial reject by using the User Management console application.

Figure 10:
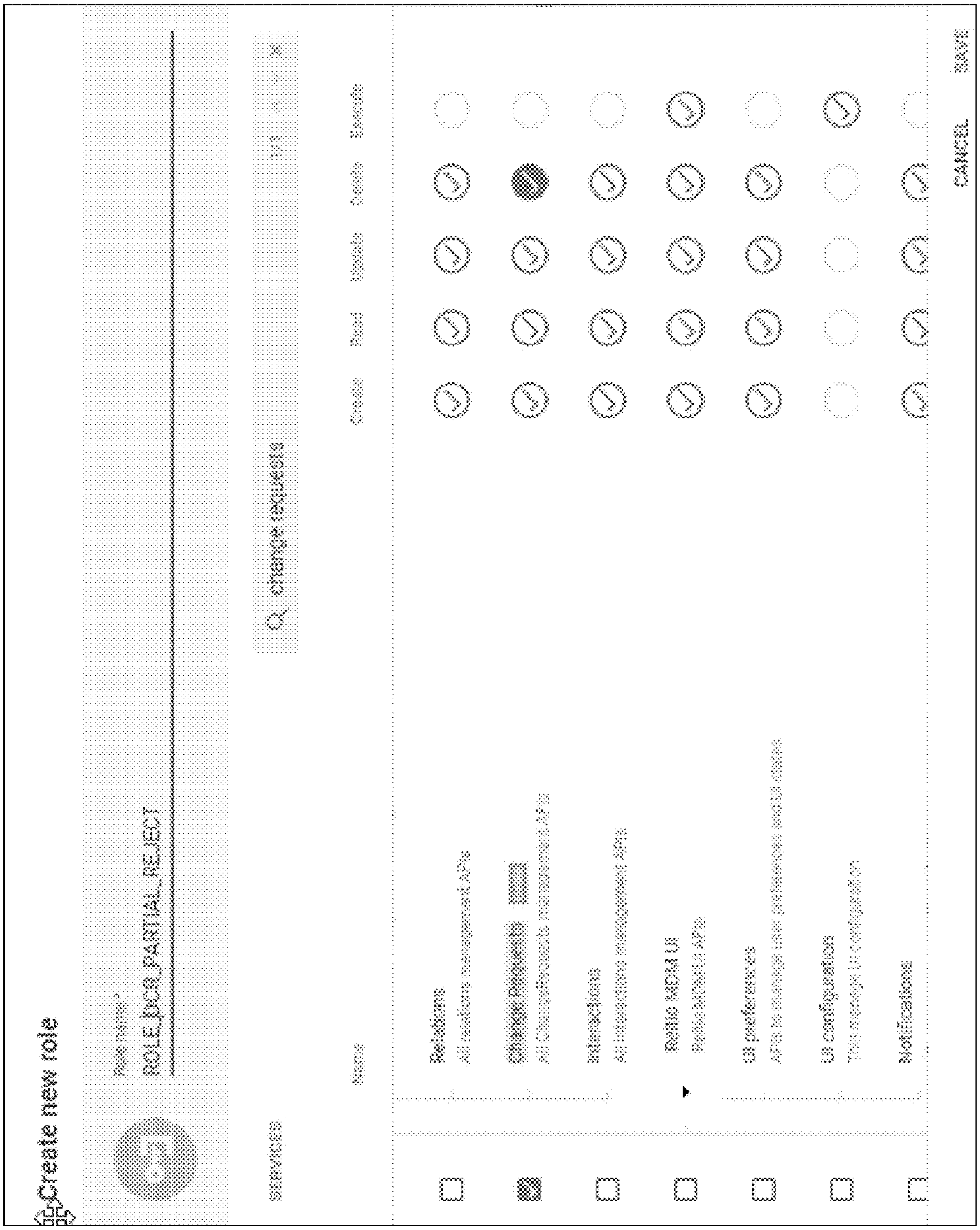
FIG. 10 depicts an interface to create a new role.

FIG. 10 depicts an interface to create a new role in some embodiments. In this example of FIG. 10, a new role is created with exact permissions (delete).

Figure 11:
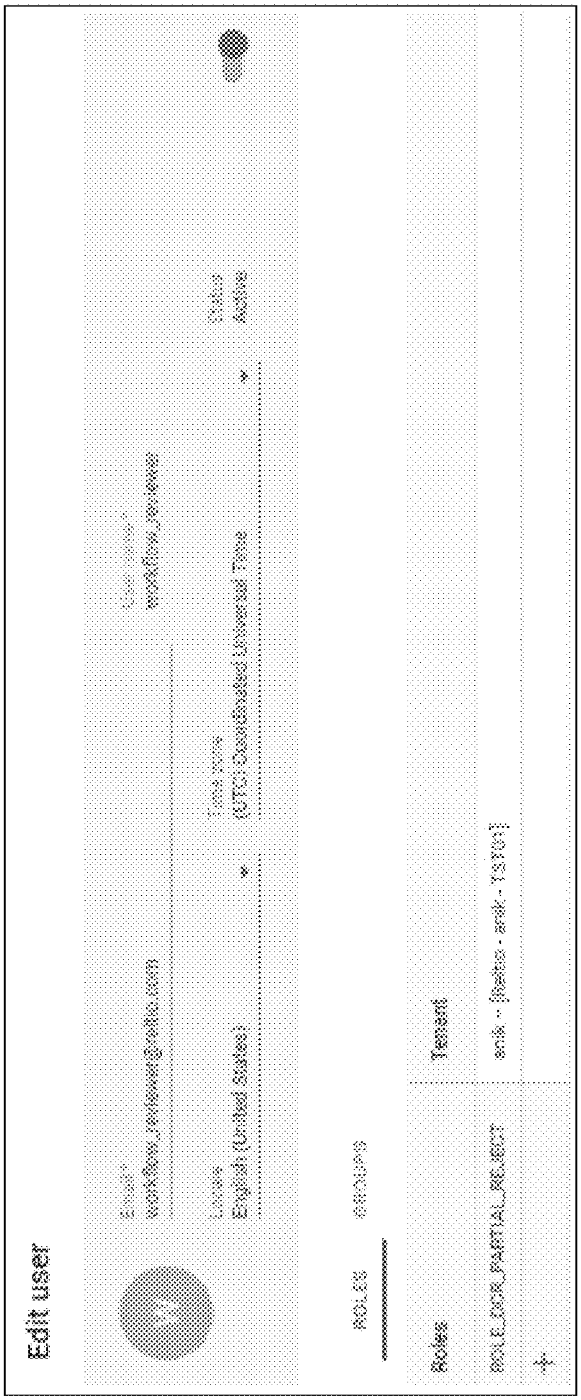
FIG. 11 depicts an interface to edit a user.

FIG. 11 depicts an interface to edit a user. In this example of FIG. 11, the role is assigned to user/users/group of users on the relevant tenants. A user can partially reject the attributes in a Data Change Request for entities and relationships. This includes nested attributes and sub attributes of a nested attribute. In addition, you can reject the entire DCR that prevents the creation of the new entities or relationships.

Figure 12:
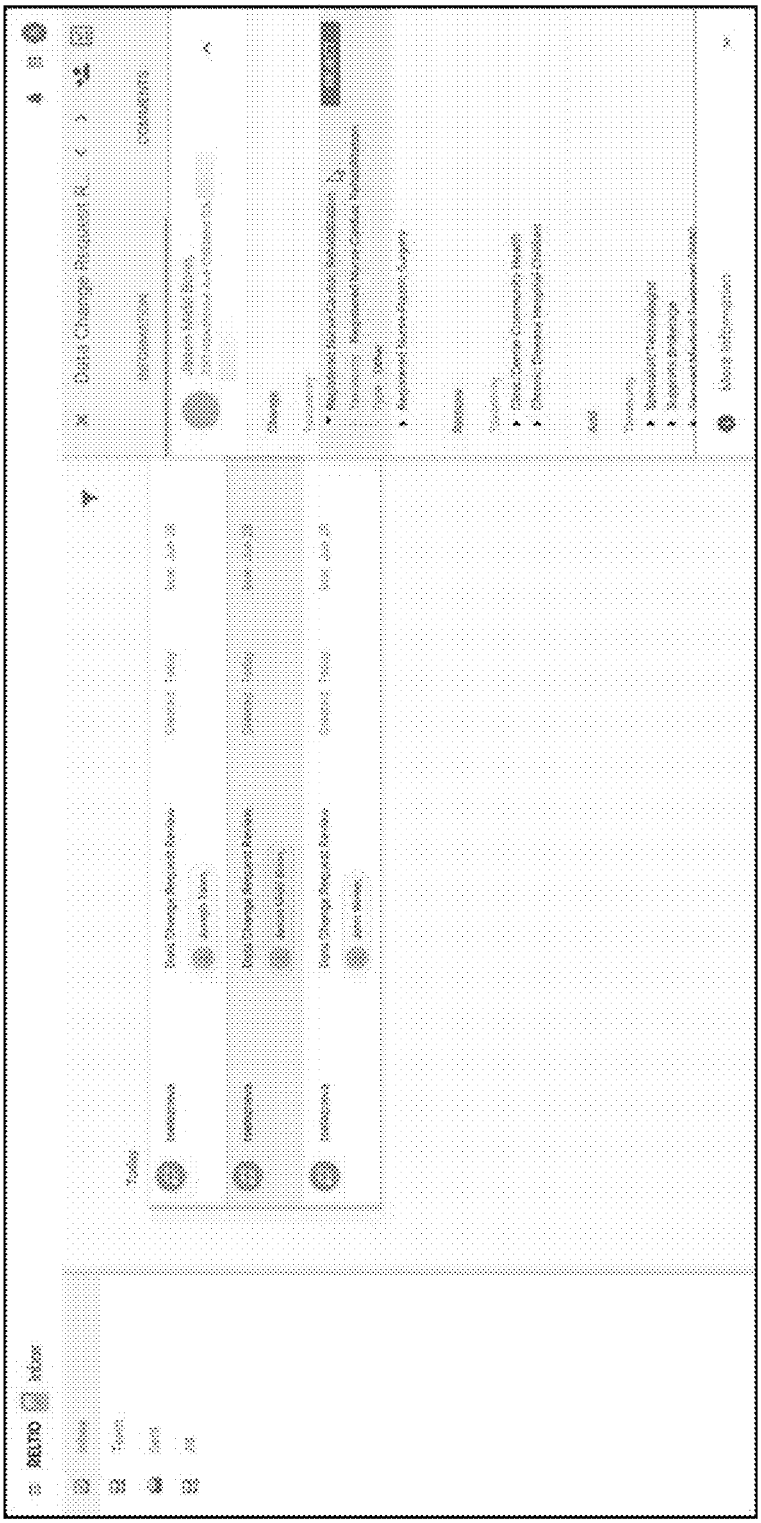
FIG. 12 depicts an interface for a data change request.

FIG. 12 depicts an interface for a data change request in some embodiments. In the interface depicted in FIG. 12, the user may select the task by clicking on the task in the Inbox tab and view the detailed information on the right panel. When you mouse over the change, the REJECT option may appear.

Figure 13:
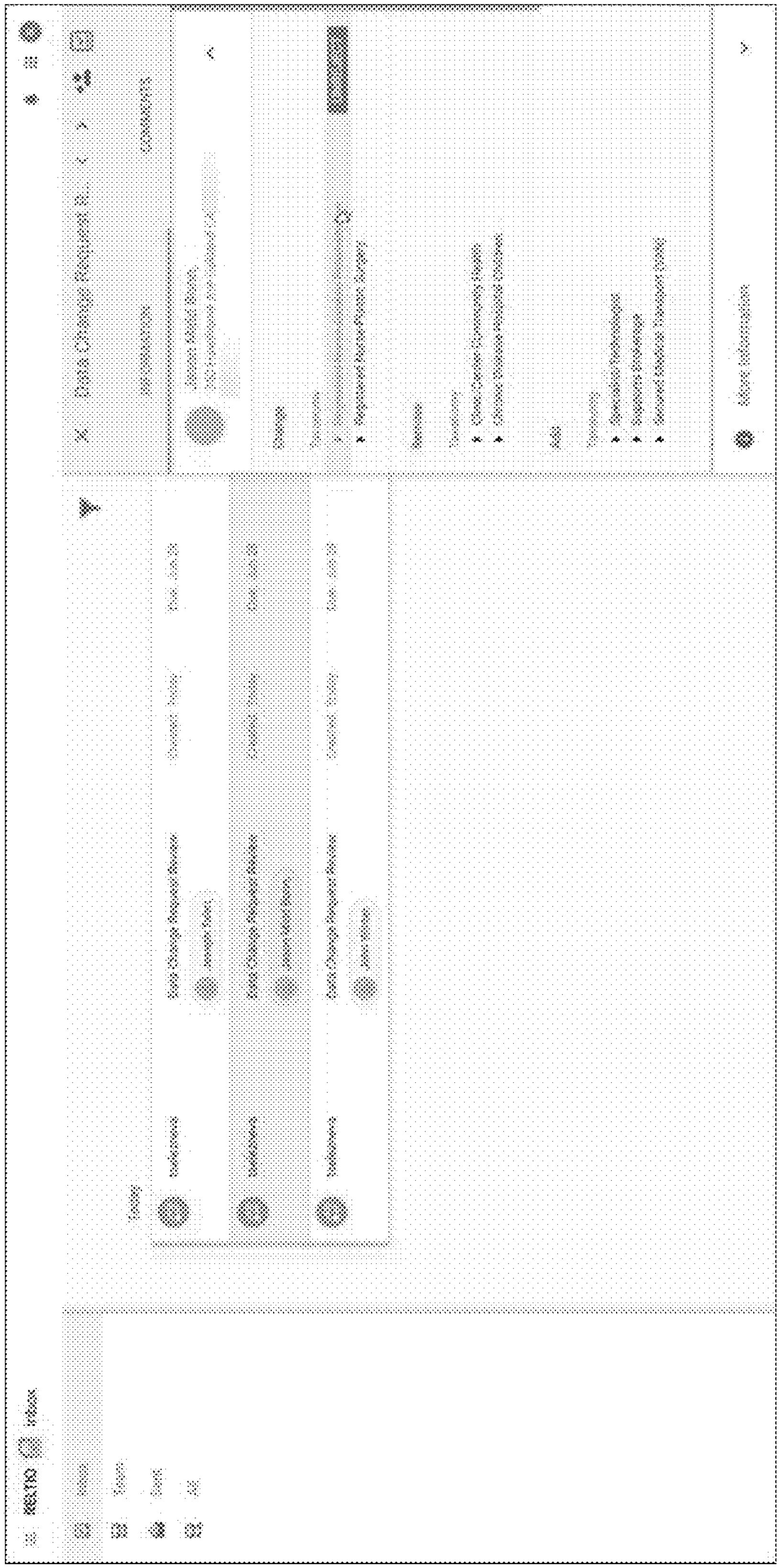
FIG. 13 depicts the interface for a data change request including an "unreject" option.

FIG. 13 depicts the interface for a data change request including an "unreject" option. The user may select the task by clicking on the task in the Inbox tab and view the detailed information on the right panel. When the user mouses over the change, the REJECT option appears.

In this example, the user may click the REJECT option corresponding to the change they want to reject. The rejected changes appear as struck out but are not deleted from the DCR until the task is approved. If the user moves to any other tab without approving the task, all rejections may be canceled. If the user chooses not to reject the change from the DCR, the user may click the UNREJECT button.

In some embodiments, reject does not work for start/end dates, roles, and tags for new entities/relationships. There may not be validation of dependencies for rejected new entities. If there is a reference attribute for this entity, it may continue to exist without changes.

In some embodiments, when changing a relationship, the old relationship is removed, and a new relationship is added. Hence, while rejecting the changes made to a relationship, both the actions remove and add may be rejected.

Figure 14:
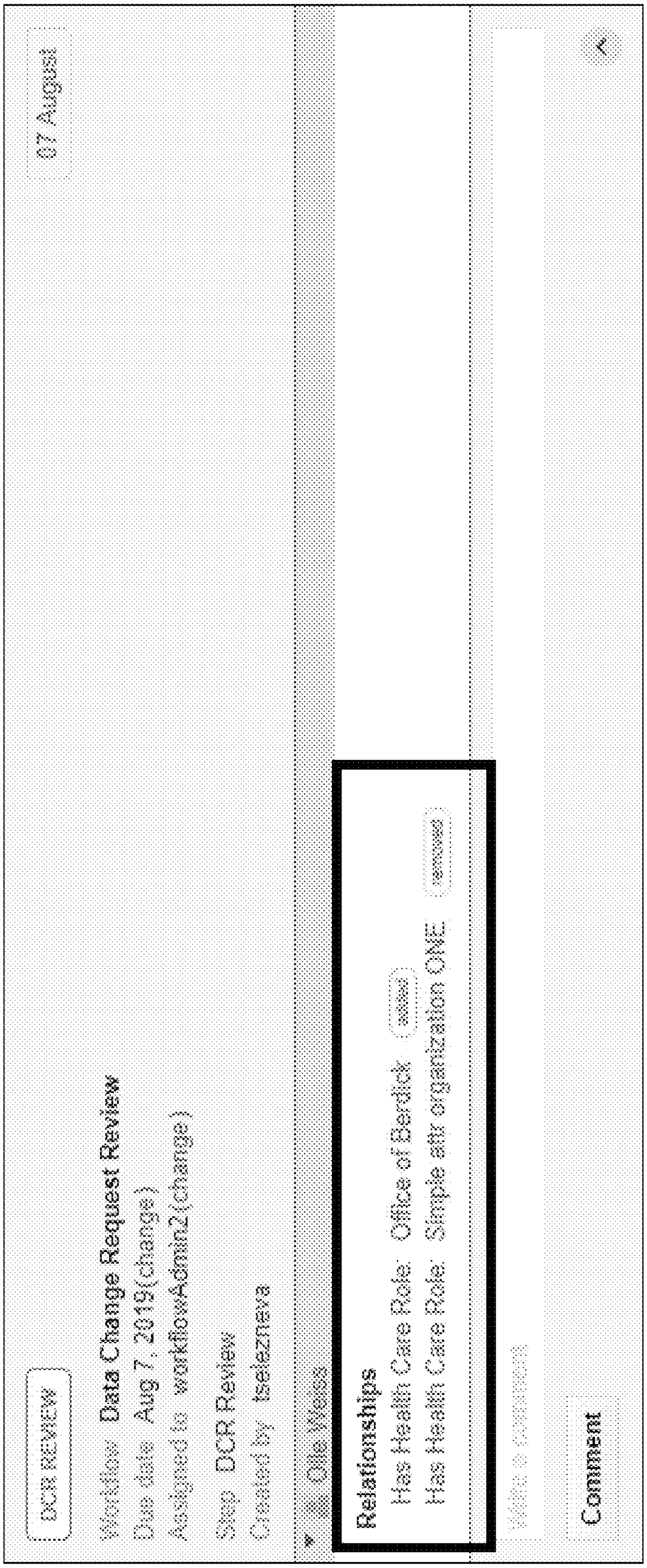
FIG. 14 depicts an interface for a data change request review depicting relationships status.

FIG. 14 depicts an interface for a data change request review depicting relationships status in some embodiments. If both the actions are not rejected, the following changes may take place: No relationships may exist if the added relationship is rejected and the removed relationship is applied; and Two relationships may exist if the added relationship is applied and the removed relationship is rejected.

Figure 15:
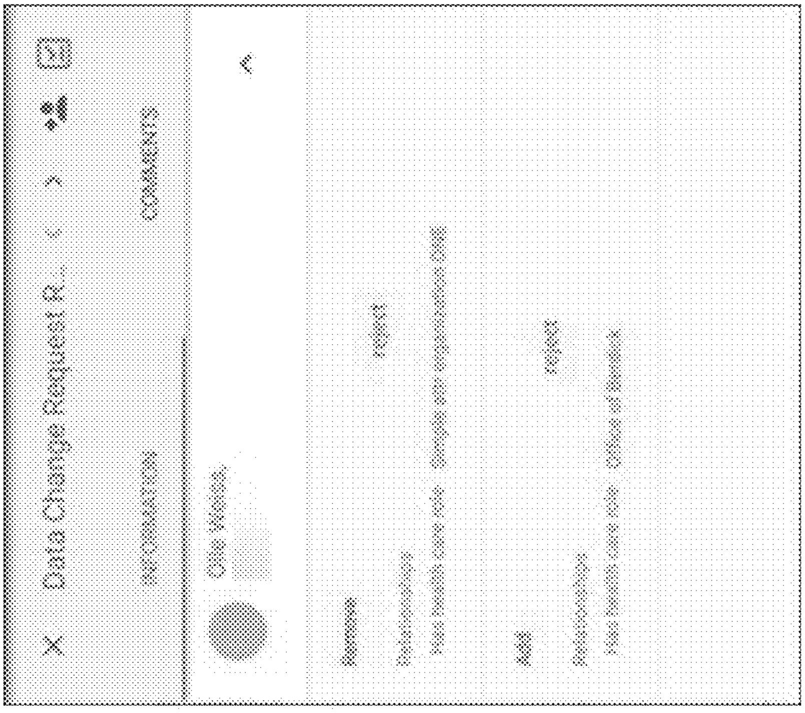
FIG. 15 depicts an interface for a data change request.

FIG. 15 depicts an interface for a data change request in some embodiments. Changes to relationships and their attributes, or new or deleted relationships, may be shown in the right-side panel as depicted in the interface of FIG. 16 in some embodiments.

If a new relationship has been added and attributes are provided, a caret icon may appear near the title of the relationship. Click the caret icon to see the added attributes.

Figure 16:
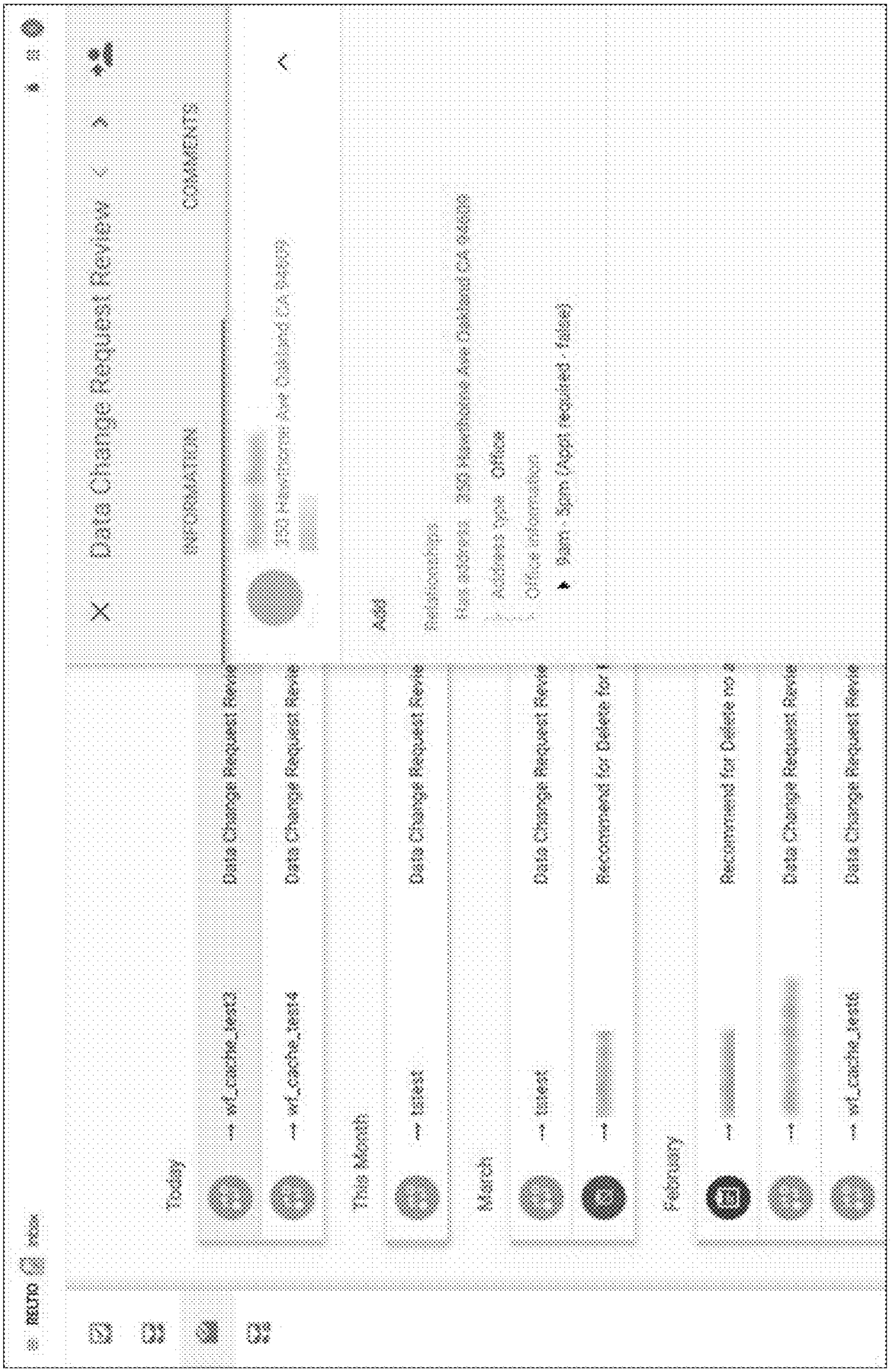
FIGS. 16, 17, and 18 depict changes to relationships and their attributes, or new or deleted relationships.
Figure 17:
Figure 18:
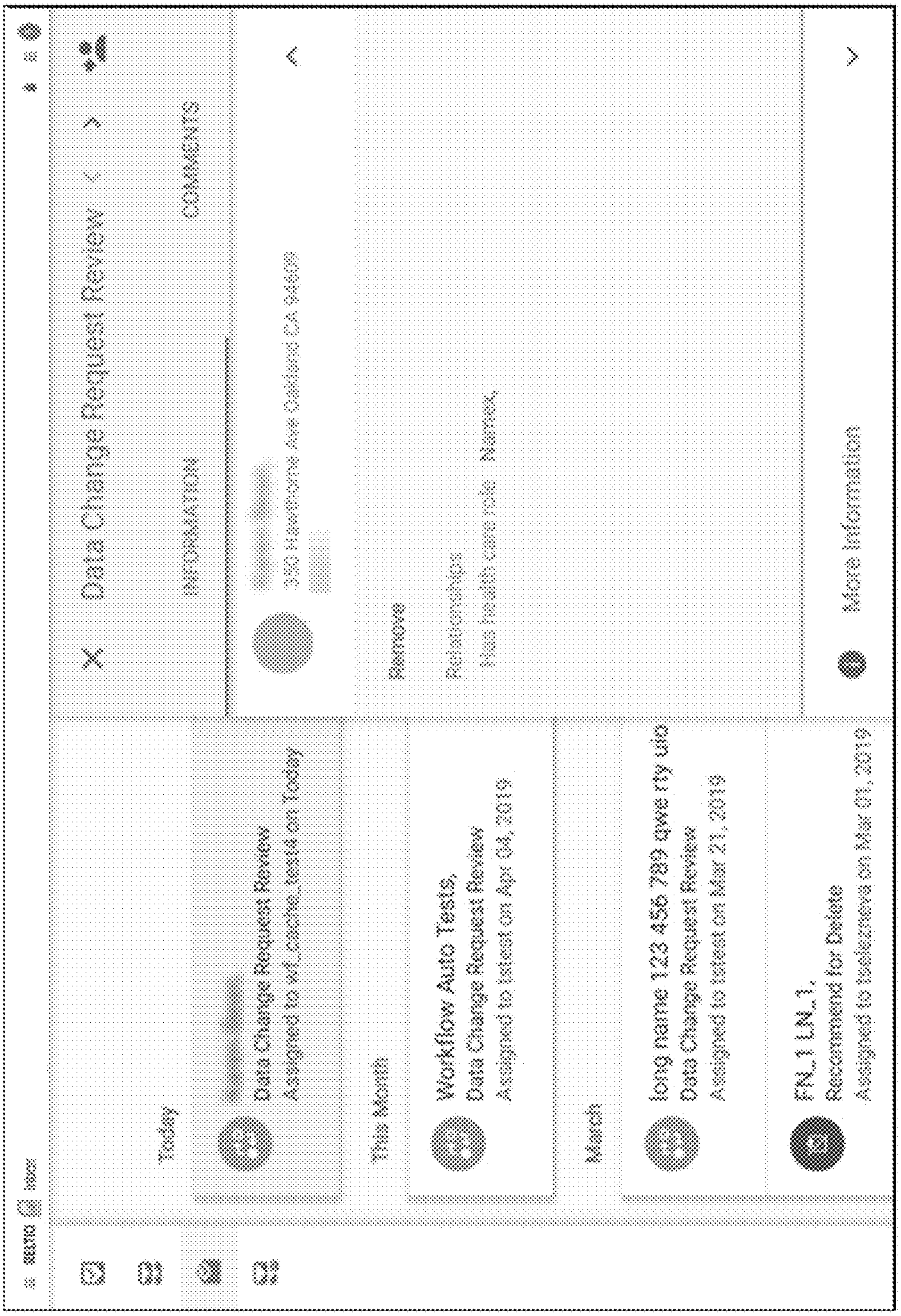

FIGS. 16, 17, and 18 depict changes to relationships and their attributes, or new or deleted relationships. If attributes have been added to an existing relationship, they may be visible at once with dashed lines from the title of the relationship to each attribute as depicted in FIG. 16. The same behavior occurs for attributes that have been changed. If a relationship was deleted, no attributers may be shown as depicted in the interface of FIG. 17 in some embodiments. If the user changes or deletes any attributes for a relationship, they are displayed similar to other attributes. Attributes for which no changes are made remain unaffected.

When a DCR is assigned to a user for review, the user may receive an email notification. When a DCR is approved or rejected, the DCR initiator may receive an email notification with the approval status, name of the approver, and comments from the person who approved. Partial reject may be automatically enabled for users who have the DELETE permission on the MDM: data.changeRequests role. Out-of-the-box workflow processes work with system role ROLE_REVIEWER, which does not have this permission. Therefore, existing customers may have this feature enabled automatically depending on permissions they have assigned to data stewards (workflow reviewers). Otherwise, customers must enable partial reject by using the User Management console application to create a new role with the exact permission (DELETE); assign this role to user/users/group of users on the relevant tenants; or Task Action—The task must be assigned to your user account.

The reviewer may partially reject the attributes in a Data Change Request for entities and relationships. This includes nested attributes and sub attributes of a nested attribute. In addition, the reviewer can reject the entire DCR that prevents the creation of the new entities or relationships. To partially reject changes, you first select the task by clicking on the task in the Inbox tab and view the detailed information on the right panel; when you mouse over the change, the REJECT option appears. Then you click the REJECT option corresponding to the change the reviewer wants to reject. The rejected changes may appear as struck out but are not deleted from the DCR till the task is approved. If you move to any other tab without approving the task, all rejections are canceled. If you choose not to reject the change from the DCR, click the UNREJECT button.

Example limitations to rejecting attributes in some embodiments include reject does not work for start/end dates, roles, and tags for new entities/relationships; and there is no validation of dependencies for rejected new entities. If there is a reference attribute for this entity, it will continue to exist without changes.

When changing a relationship, the old relationship is removed, and a new relationship is added. So, while rejecting the changes made to a relationship, both the actions remove and add may be rejected. If both the actions are not rejected, the following changes may take place: 1) No relationships may exist if the added relationship is rejected, and the removed relationship is applied; 2) Two relationships may exist if the added relationship is applied and the removed relationship is rejected.

Changes to relationships and their attributes, or new or deleted relationships, may be shown in the UI. In some embodiments, if a new relationship has been added and attributes are provided, a caret icon appears near the title of the relationship. Click the caret icon to see the added attributes. If attributes have been added to an existing relationship, they are visible at once with dashed lines from the title of the relationship to each attribute. The same behavior occurs for attributes that have been changed.

If the user change or delete any attributes for a relationship, they are displayed similar to other attributes. Attributes for which no changes are made remain unaffected. If a relationship was deleted, no attributes may be shown.

When a DCR is assigned to a user for review, the user may receive an email notification. When a DCR is approved or rejected, the DCR initiator gets an email notification with the approval status, name of the approver, and comments from the person who approved.

The metadata-driven cloud-based platform 102 may provide the ability to manage a variety of data entities using Hub. A profile is a collection of all the data associated with an entity. Profiles contain the attributes for an entity, relationships for an entity, and sources for all of the attributes. It is possible that an entity attribute can have multiple sources and multiple values. The Operational Value (OV) is the current value for a given attribute, as defined by the survivorship rule for the attribute. The Profile pages enable you to view and manage the details for each entity in your tenant.

In various embodiments, Inbox enables a user to efficiently view, manage, and work on the business tasks assigned to a user or the user's team. The Inbox has filtering capabilities. Also, the user may create a workflow task and take action to review a potential match. As an assignee you can take required actions on a workflow task. The metadata-driven cloud-based platform 102 provides an easy way to review potential matches from the Search view. Every workflow task can have variables associated with the entire workflow process or specific to a step. These variables usually have internal information that can be used in custom workflows.

The user may want to access Inbox from your mobile devices, such as Smartphones or Tablets. The mobile experience is optimized for smaller form factors with support for gestures.

Inbox: Lists tasks and displays information such as, name of the creator, status of the task, created date, and the due date. The task icon indicates the process the task belongs to. More than one process can be represented in the list, and the processes can be varied with regard to things like approving an expense report, matching tasks, and so on.

Team: Lists tasks assigned to the user's team members. Team members can perform any task, reassign any task, or simply view any task.

Sent: Lists tasks that you sent for approval.

All: Lists all open and closed tasks. The users who have the necessary permissions will be able to access the closed or resolved tasks. By default, closed tasks will be available in Inbox for a period of one year from the resolved or closed date.

Figure 19:
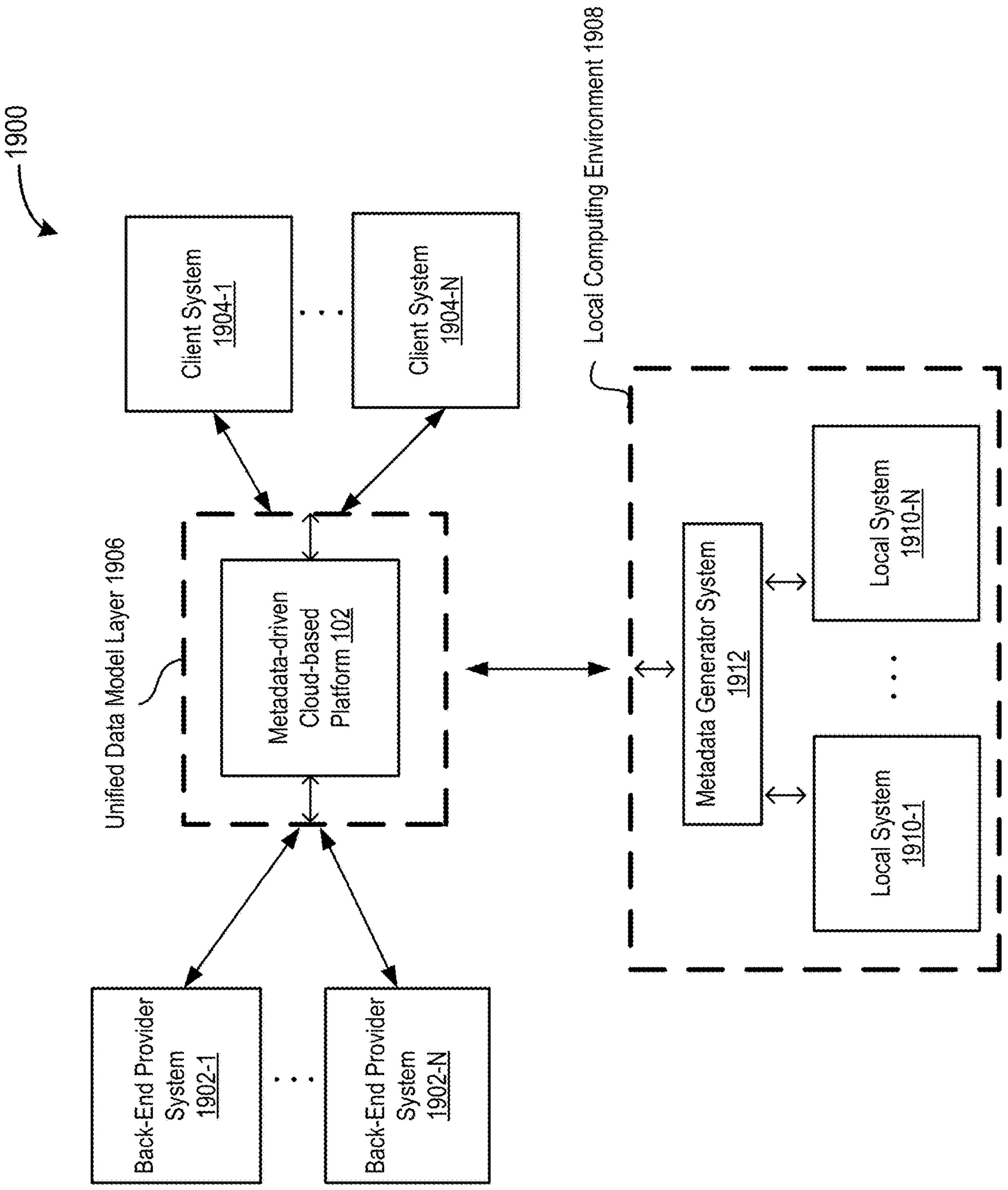
FIG. 19 depicts a diagram of an example system implementing secure metadata-driven data management.

FIG. 19 depicts a diagram 1900 of an example system implementing secure metadata-driven data management. In the example of FIG. 19, the system includes a metadata-driven cloud-based platform 102, back-end provider systems 1902-1 to 1902-N (individually, the back-end provider system 1902, collectively, the back-end provider systems 1902), client systems 1904-1 to 1904-N (individually, the client system 1904, collectively, the client systems 1904), a unified data model layer 1906, and a local computing environment 1908 with local systems 1910-1 to 1910-N (individually, the local system 1910, collectively, the local systems 1910) and a metadata generator system 1912.

In the example of FIG. 19, the metadata-driven cloud-based platform 102 is a multi-domain and/or multi-tenant computing platform that enables seamless integration of many types of data from many sources. The platform may include a variety of different data structures having different formats, structures, data, and/or the like. The metadata-driven cloud-based platform 102 may include some or all functionality and components as the metadata-driven cloud-based platform 102 described elsewhere herein.

In some embodiments, the metadata-driven cloud-based platform 102 efficiently provides secure data management operations without unnecessarily exposing sensitive data. More specifically, the metadata-driven cloud-based platform can use the unified data model layer 1906 and data management operation metadata to operate on data in the cloud environment of the platform 102 without exposing sensitive data to the platform 102 and/or other systems.

In the example of FIG. 19, the back-end provider systems 1902 include different back-end service provider systems. The back-end provider systems can include cloud-native service providers (e.g., AWS, Azure), hosted-service providers, and the like. The back-end service provider systems 1902 can provide storage services and/or other back-end services for the metadata-driven cloud-based platform 102 and the clients (e.g., tenants) thereof.

In the example of FIG. 19, the client systems 1904 include clients of the metadata-driven cloud-based platform 102. The client systems may be clients of the metadata-driven cloud-based platform 102 and may be associated with one or more tenants and/or domains of the metadata-driven cloud-based platform 102.

In the example FIG. 19, the unified data model layer 1906 enables the metadata-driven cloud-based platform 102 to provide a logical view (e.g., single logical view) of the data structures of the metadata-driven cloud-based platform 102. For example, the unified data model layer 1906 may enable the metadata-driven cloud-based platform 102 to provide a respective logical view of the data structures associated with a particular tenant. In some embodiments, the unified data model layer 1906 maps different attribute fields (e.g., application fields) into a single logical view. For example, the client systems 1904 may have no idea what back-end provider 1902 that the metadata-driven cloud-based platform 102 is using to store and manage their data. Accordingly, customers do not have to worry about database design and can use the unified data model across an entire enterprise.

In the example of the FIG. 19, the unified data model layer 1906 cooperates with the metadata-driven cloud-based platform 102, local computing environment 1908, client systems 1904, and back-end provider systems 1902 to provide single front-end across all backend service providers 1902, which can provide benefits of scaling, which can be transparently managed by the service providers 1902. For example, the metadata-driven cloud-based platform 102 may "hook" into the unified data model layer to map attributes of the back-end service providers 1902 to corresponding attributes of the unified data model layer 1906. This can enable the metadata-driven cloud-based platform 102 to seamlessly, dynamically, and/or transparently switch cloud-service providers 1902.

In the example of FIG. 19, the local computing environment 1908 comprises a local environment remote from the metadata-driven cloud-based platform 102. The local computing environment 1908 includes local systems 1910 (e.g., computers of an enterprise organization) of a network (e.g., enterprise network). The local computing environment 1908 may include one or more LANs, WANs, and the like (e.g., of an enterprise organization).

In the example of FIG. 19, the metadata generator system 1912 generates data management operation metadata that describes operations and data involving private data that are executed in the local computing environment 1908 (e.g., by the local systems 1910). In some embodiments, the data management operation metadata may comprise anonymized data, data types, field identifiers, private/public identifiers, natural language descriptions, machine language descriptions, and the like. In one example, a local system 1910 executes an application. The application may be a SaaS application (e.g., hosted by the metadata-driven cloud-based platform), a local application (e.g., local to the local computing environment 1908 and/or local system 1910), a virtualized application, and the like. The application may perform various operations (e.g., editing operations of a word processing application) involving sensitive data (e.g., healthcare data). Rather than sending sensitive data to the metadata-driven cloud-based platform 102, the metadata generator system 1912 can generate corresponding data management operation metadata describing the operations and/or sensitive data, and then transmit that data management operation metadata to the metadata-driven cloud-based platform 102.

In some embodiments, the metadata generator system 1912 identifies sensitive data based on the unified data model (e.g., rules and/or dependencies of the unified data model). For example, the metadata generator system 1912 can be configured based on the unified data model. The unified data model can indicate data that should be marked as private, data that should be marked as public, and dependency information (e.g., data that depends on other data).

Figure 20:
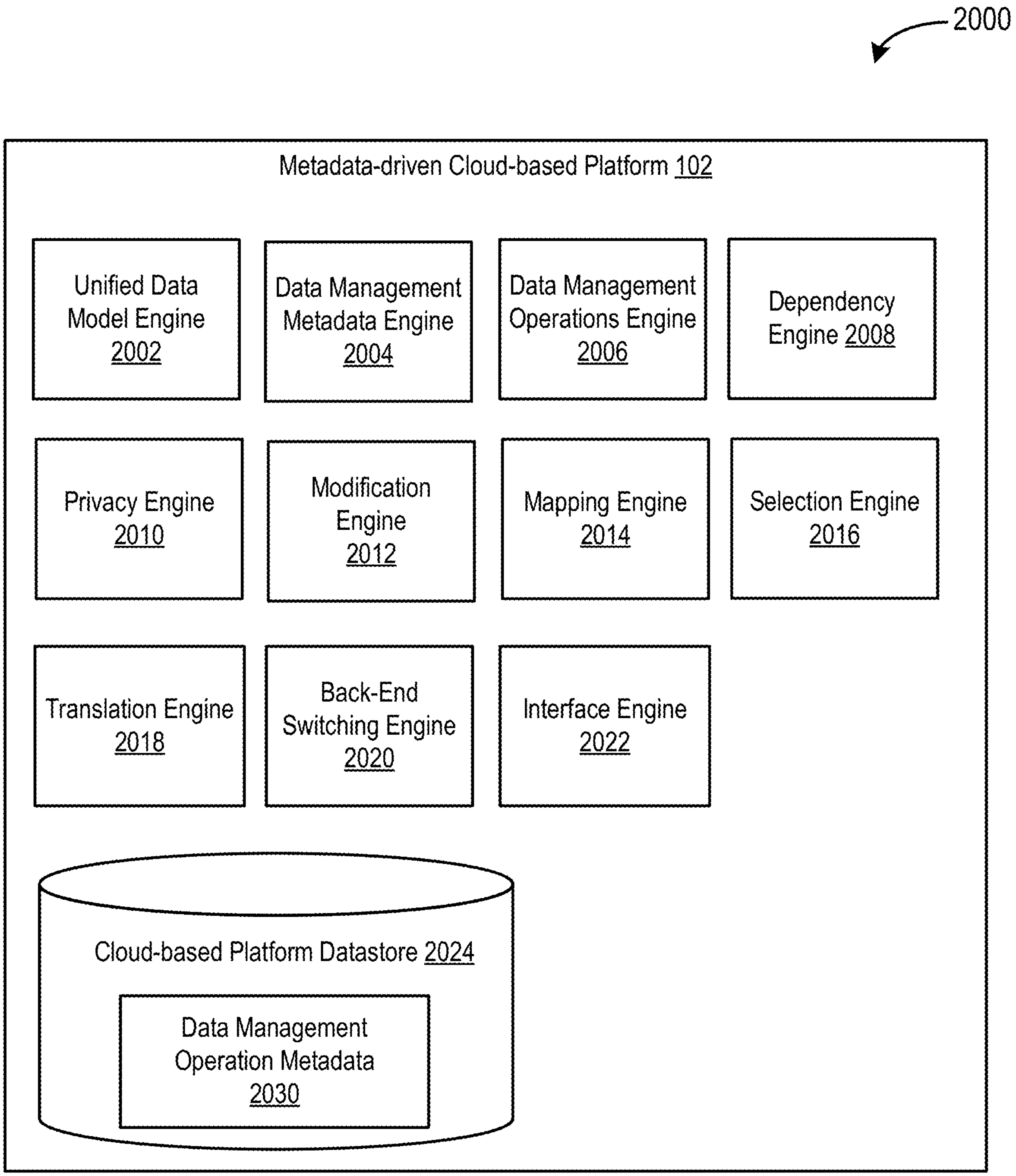
FIG. 20 depicts a diagram of an example of a metadata-driven cloud-based platform.

FIG. 20 depicts a diagram 2000 of an example metadata-driven cloud-based platform 102. In the example of FIG. 20, the metadata-driven cloud-based platform 102 includes a unified data model engine 2002, a data management metadata engine 2004, a data management operations engine 2006, a dependency engine 2008, a privacy engine 2010, a modification engine 2012, a mapping engine 2014, a selection engine 2016, a translation engine 2018, a back-end switching engine 2020, an interface engine 2022, and a metadata-driven cloud-based platform datastore 2024 that includes a data management operation metadata module 2030.

The unified data model engine 2002 is intended to represent an engine that generates, obtains, manages, and/or access a unified data model. The unified data model may provide, for example, a logical view of the data structures of the metadata-driven cloud-based platform 102 associated with a particular tenant. In some embodiments, the unified data model normalizes (e.g., standardizes) the various underlying data structures, applications, functions, and/or back-end services of the multi-tenant computing platform. The unified data model may include normalized attributes, relationships, functions, and/or mappings of the underlying data structures, applications, functions, and/or back-end services of the multi-tenant computing platform.

The data management metadata engine 2004 is intended to represent an engine that receives and/or processes data management operation metadata (e.g., metadata generated by the metadata generator system 1912). For example, the data management metadata engine 2004 can determine, using the data management operation metadata, that two or more data records should be merged. The data management operation can be performed without the data management metadata engine 2004 or other component knowing the information contained in those data records. For example, the data management operation metadata may include duplicate record identifiers, and the data management metadata engine 2004 can determine that those records should be merged (e.g., by the data management operations engine 2006).

The data management operations engine 2006 is intended to represent an engine that executes data management operations using the data management operation metadata. Data management operations can include merging operations, deduplication operations, curation operations, retention operations, digital preservation operations, and the like. The data management operations engine 2006 may execute data management operations in cooperation with the data management metadata engine 2004 (e.g., as instructed by the data management metadata engine 2004).

The dependency engine 2008 is intended to represent an engine that identifies data dependencies based on the unified data model. In some embodiments, the unified data model can include dependency graphs indicating data dependencies (e.g., data X depends on data Y). for example, the privacy engine 2010 can change a public data identifier to a private data identifier if that public data depends on private data. Accordingly, the dependency engine 2008 may change public data to private based on dependency information.

The privacy engine 2010 is intended to represent an engine that determines privacy information (e.g., privacy information rules) indicating which data should be marked as private and/or public. The privacy engine 2010 may define rules and/or dependencies graphs indicating data that is private and/or public. Rules can be included in the unified data model. Rules can be user defined and/or automatically defined. In some embodiments, one or more machine learning models can be used to generate the rules. For example, the machine learning models may use information of an enterprise (e.g., documents, manuals, applications, data records) and identify which data should be marked as private (e.g., sensitive healthcare information). The privacy engine 2010 can provide the privacy information to the metadata generator system 1912 which can then generate data management operation metadata based on that privacy information. If the privacy information changes, the metadata generator system 1912 can generate data management operation metadata based on the changed privacy information.

The modification engine 2012 is intended to represent an engine that can modify the metadata-driven cloud-based platform 102. More specifically, the modification engine 2012 can modify the different underlying data structures, applications, functions, and back-end services of the metadata-driven cloud-based platform 102. For example, the modification engine 2012 can change database applications, designs and/or storage schemes. In some embodiments, the modification engine 2012 can detect modifications of the underlying data structures, applications, functions, and back-end services of the metadata-driven cloud-based platform 102 (e.g., modification performed by the metadata-driven cloud-based platform 102 and/or other associated systems, engines, users, and the like). The modification engine 2012 may trigger the unified data model engine 2002 to update the attributes, relationships, functions, and/or mappings of the unified data model.

The mapping engine 2014 is intended to represent an engine that maps attributes back-end service providers (e.g., back-end service providers) to corresponding attributes of a unified data model. Attributes can include applications (and associated identifiers), data structures (and associated identifiers), communication protocols (and associated identifiers), interfaces (and associated identifiers), and/or the like.

The selection engine 2016 is intended to represent an engine that identifies and/or selects various storage schemes and/or back-end services providers. The selection engine 2016 may select storage schemes and/or back-service providers based on the unified data model, tenant requirements and/or design specifications, and/or the like.

The translation engine 2018 is intended to represent an engine that translates instructions received through a front-end of the metadata-driven cloud-based platform 102 into the appropriate storage instructions for one or more associated back-end service providers. For example, the translation may map of the unified data model and specifications or interfaces of the back-end service providers to perform the translation.

The back-end switching engine 2020 is intended to represent an engine that seamlessly, transparently, and/or dynamically switches from one storage scheme and/or back-end service provider to one or more other back-end service providers.

The interface engine 2022 is intended to represent an engine that presents visual, audio, and/or haptic information. In some implementations, the interface engine 2022 generates graphical user interface components (e.g., server-side graphical user interface components) that can be rendered as complete graphical user interfaces on various systems (e.g., client systems). The interface engine 2022 can function to present an interactive graphical user interface for display and receiving information.

Figure 21:
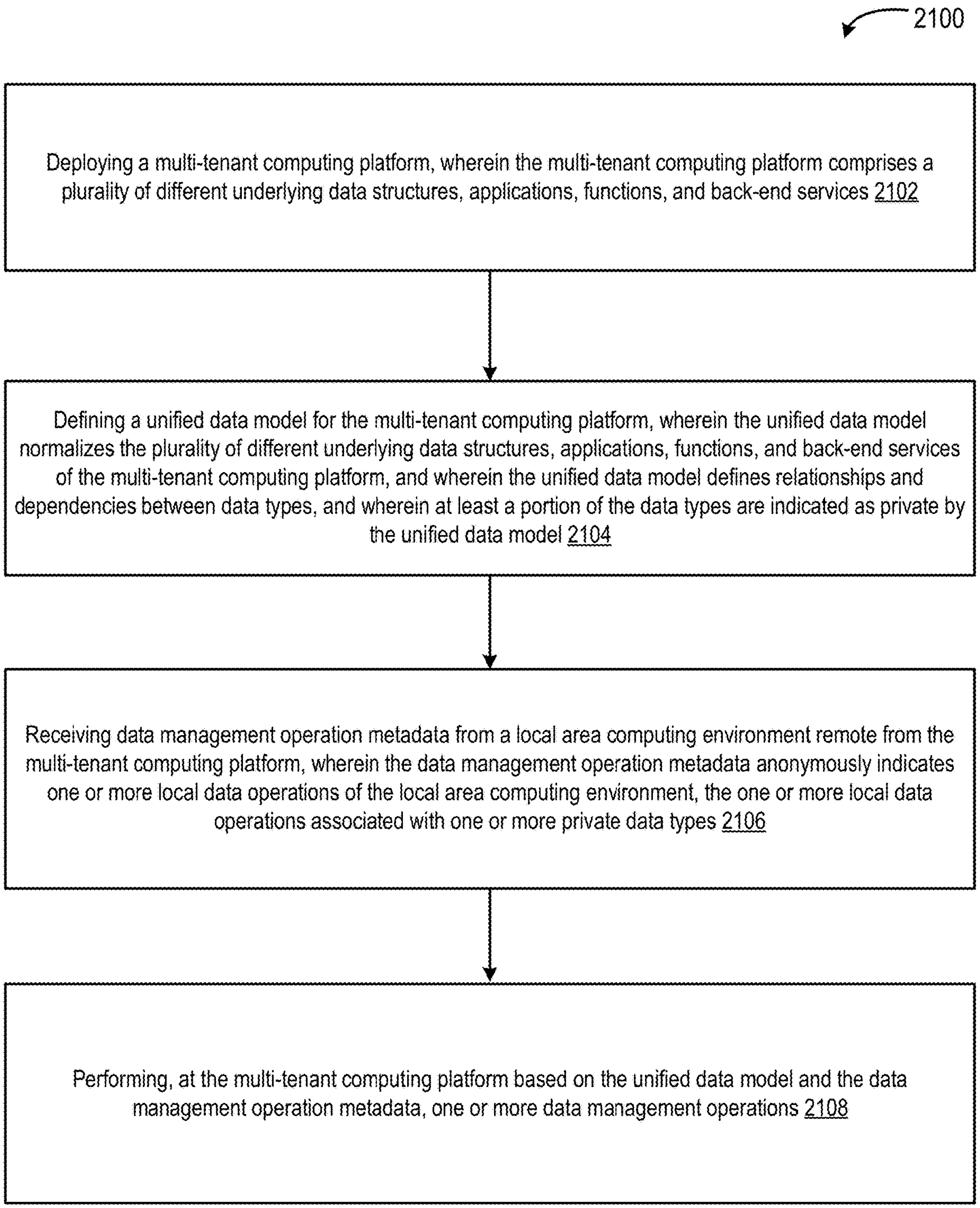
FIG. 21 depicts a flowchart of an example method of implementing secure metadata-driven data management.

FIG. 21 depicts a flowchart 2100 of an example method of implementing secure metadata-driven data management. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2102, a multi-tenant computing platform (e.g., metadata-driven cloud-based platform 102) is deployed. The computing system includes a variety of different underlying data structures, applications, functions, and back-end services.

In module 2104, the multi-tenant computing platform defines a unified data model (e.g., unified data model layer 1906) for the multi-tenant computing platform. The unified data model can normalize the different underlying data structures, applications, functions, and back-end services of the multi-tenant computing platform. The unified data model can also define relationships and dependencies between data and/or data types of the metadata-driven cloud-based platform. In some embodiments, at least a portion of the data and/or data types are indicated (e.g., marked or flagged) as private (e.g., as opposed to public or other non-private identifier) by the unified data model.

In module 2106, the multi-tenant computing platform receives data management operation metadata from a local area computing environment remote from the computing system. The data management operation metadata can anonymously indicate one or more local data operations of the local area computing environment and local systems. The local data operations can be associated with one or more private data types.

In module 2108, the multi-tenant computing platform performs, based on the unified data model and the data management operation metadata, one or more data management operations (e.g., merges, deduplications, and the like).

Figure 22:
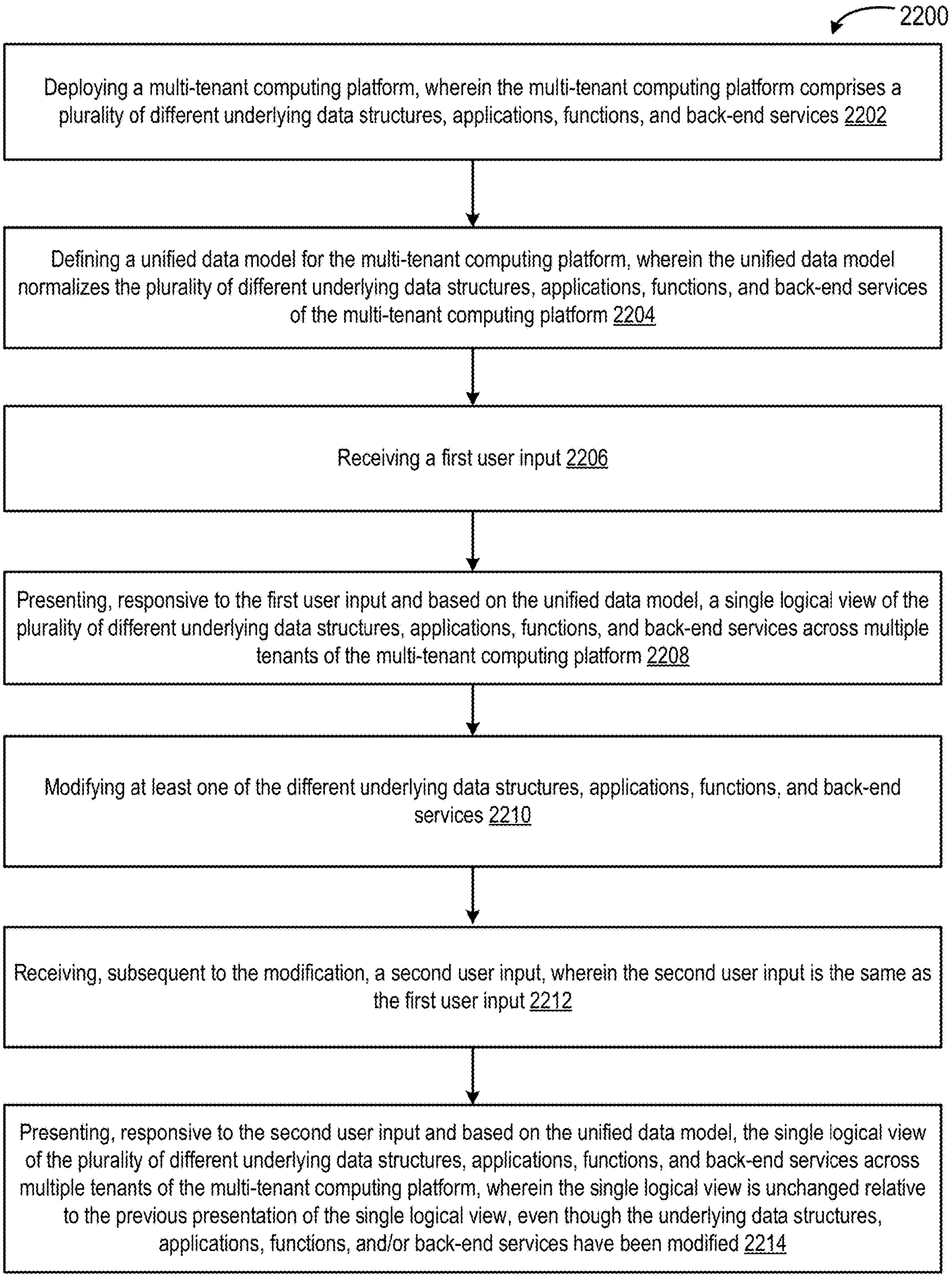
FIG. 22 depicts a flowchart of an example method of implementing a unified data model across multiple tenants of a multi-tenant platform.

FIG. 22 depicts a flowchart 2200 of an example method of implementing a unified data model across multiple tenants of a multi-tenant platform. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2202, a multi-tenant computing platform (e.g., metadata-driven cloud-based platform 102) is deployed. The multi-tenant computing platform may include a variety of different underlying data structures, applications, functions, and back-end services. In some embodiments, a unified data model engine (e.g., unified data model engine 2002) access the multi-tenant computing platform.

In module 2204, the multi-tenant computing platform defines a unified data model for the multi-tenant computing platform. The unified data model can, for example, normalize the various underlying data structures, applications, functions, and back-end services of the multi-tenant computing platform. In some embodiments, the unified data model engine defines the unified data model.

In module 2206, the multi-tenant computing platform receives a first user input.

In module 2208, the multi-tenant computing platform presents, responsive to the first user input and based on the unified data model, a single logical view of the plurality of different underlying data structures, applications, functions, and back-end services across multiple tenants of the multi-tenant computing platform.

In module 2210, the multi-tenant computing platform modifies at least one of the different underlying data structures, applications, functions, and back-end services. In some embodiments, the computing system detects the modification (e.g., using modification engine 2012 of the metadata-driven cloud-based platform).

In module 2212, the multi-tenant computing platform receives, subsequent to the modification, a second user input. The second user input may be the same as the first user input (e.g., the second user input is identical to the first user input).

In module 2214, the multi-tenant computing platform presents, responsive to the second user input and based on the unified data model, the single logical view of the plurality of different underlying data structures, applications, functions, and back-end services across multiple tenants of the multi-tenant computing platform. More specifically, the single logical view is unchanged relative to the previous presentation of the single logical view, even though the underlying data structures, applications, functions, and/or back-end services have been modified.

Figure 23:
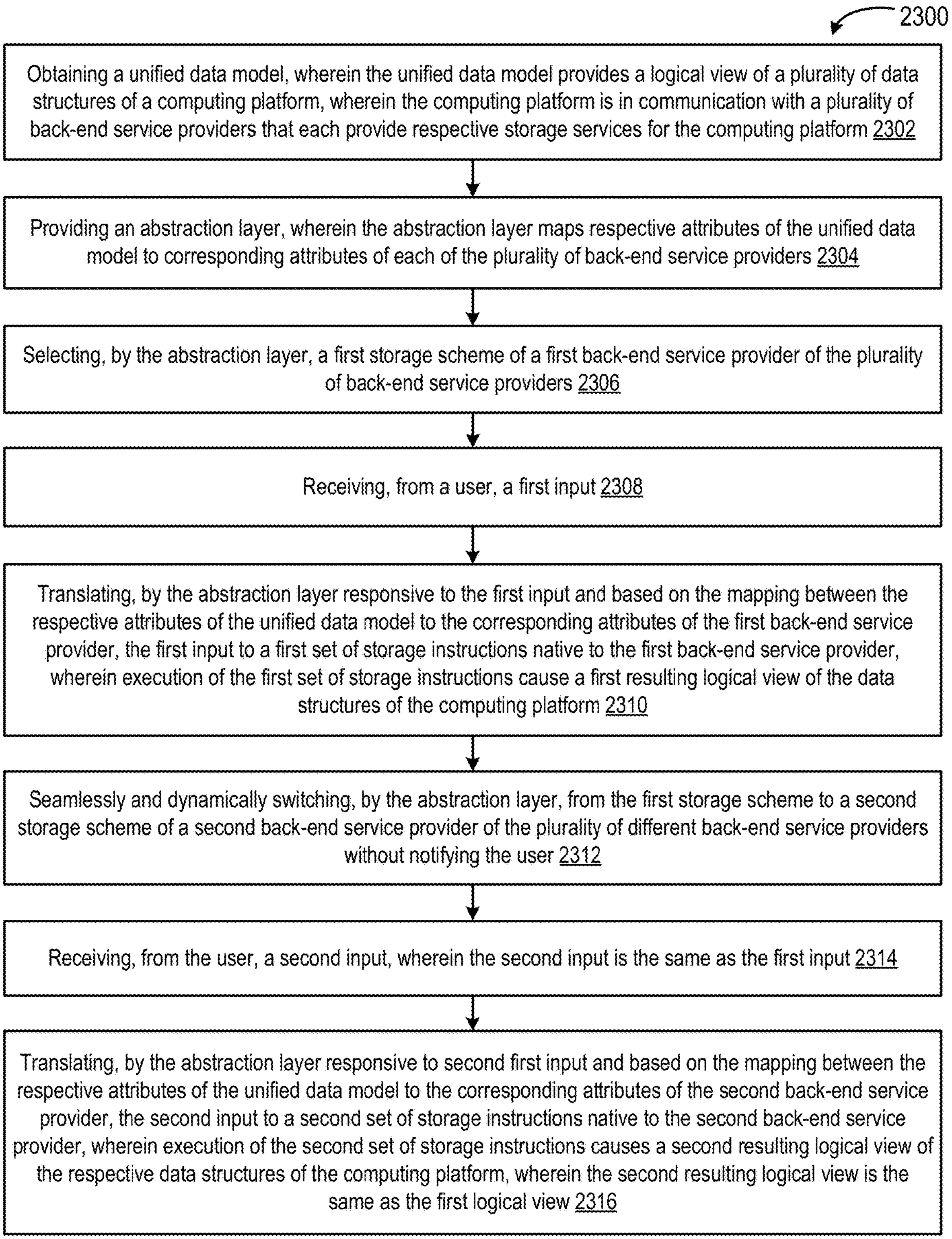
FIG. 23 depicts a flowchart of an example method of dynamic and seamless switching of cloud-native service providers using an abstraction layer hooked into a unified data model for a multi-tenant computing platform.

FIG. 23 depicts a flowchart 2300 of an example method of dynamic and seamless switching of cloud-native service providers using an abstraction layer (e.g., provided by metadata-driven cloud-based platform 102) hooked into a unified data model for a computing platform. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2302, a computing platform (e.g., metadata-driven cloud-based platform 102) obtains and/or accesses a unified data model. The unified data model may provide a logical view of a plurality of data structures of the computing platform. The computing platform may be in communication with a plurality of cloud-native service providers that each provide respective storage services and/or other back-end services for the computing platform.

In module 2304, the computing platform provides an abstraction layer that maps respective attributes of the unified data model to corresponding attributes of each of the plurality of back-end service providers. Attributes can include applications (and associated identifiers), data structures (and associated identifiers), communication protocols (and associated identifiers), interfaces (and associated identifiers), and/or the like.

In module 2306, the abstraction layer selects a first storage scheme of a first back-end service provider of the plurality of back-end service providers.

In module 2308, the computing platform receives, from a user, a first input.

In module 2310, the abstraction layer translates, responsive to the first input and based on the mapping between the respective attributes of the unified data model to the corresponding attributes of the first back-end service provider, the first input to a first set of storage instructions native to the first back-end service provider. An execution (e.g., by the computing platform) of the first set of storage instructions may cause a first resulting logical view of the data structures of the computing platform.

In module 2312, the abstraction layer seamlessly and dynamically switches from the first storage scheme to a second storage scheme of a second back-end service provider of the plurality of different back-end service providers without notifying the user.

In module 2314, the computing platform receives, from the user, a second input. The second input may be the same as the first input (e.g., the second input is identical to the first input).

In module 2316, the abstraction layer translates, responsive to second first input and based on the mapping between the respective attributes of the unified data model to the corresponding attributes of the second back-end service provider the second input to a second set of storage instructions native to the second back-end service provider. An execution of the second set of storage instructions (e.g., by the computing platform) may causes a second resulting logical view of the respective data structures of the computing platform, wherein the second resulting logical view is the same as the first logical view.

As used in this paper, in some embodiments, the abstraction layer may be provided by the metadata-driven cloud-based platform 102.

Figure 24:
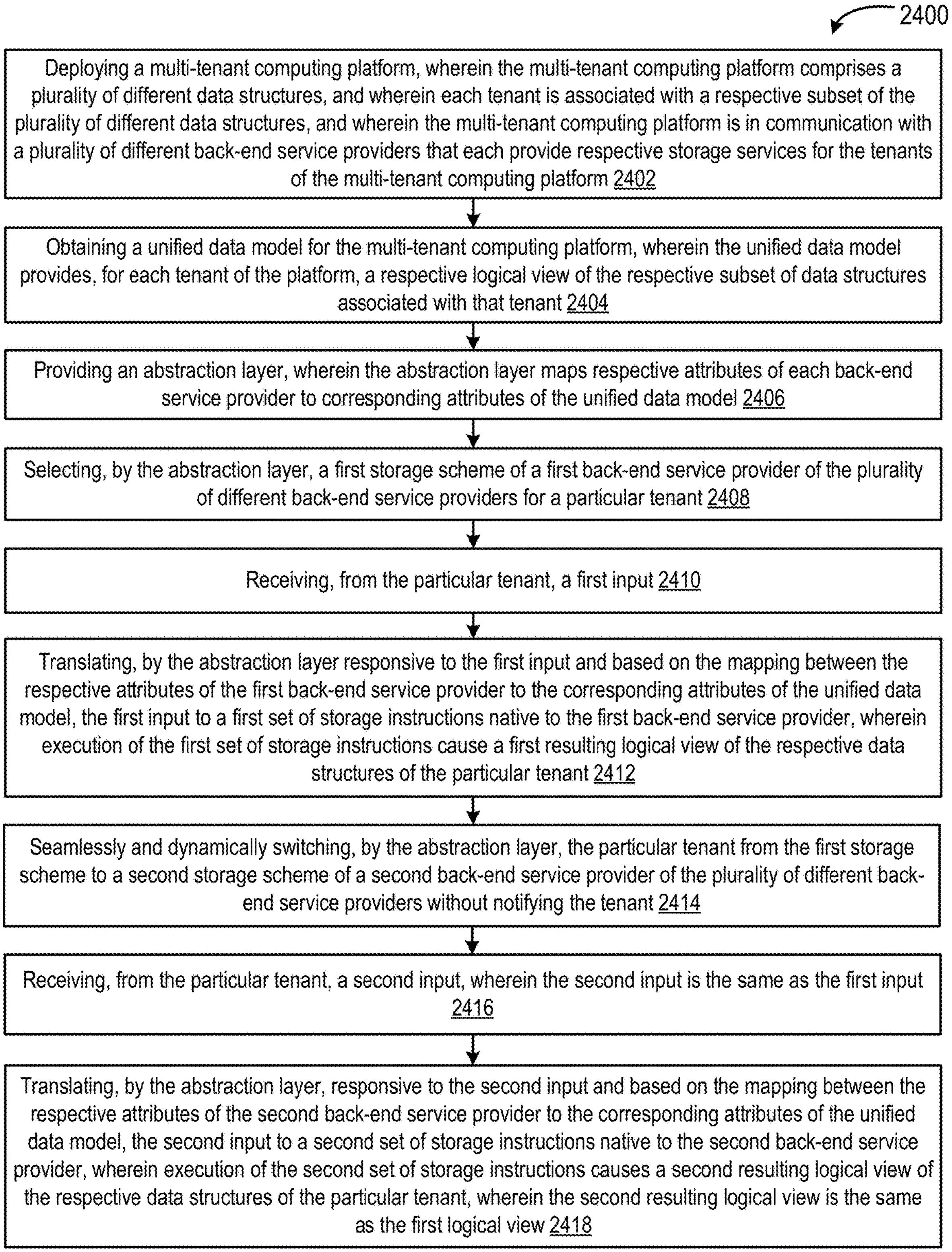
FIG. 24 depicts a flowchart of an example method of dynamic and seamless switching of cloud-native service providers using an abstraction layer hooked into a unified data model for a multi-tenant computing platform.

FIG. 24 depicts a flowchart 2400 of an example method of dynamic and seamless switching of cloud-native service providers using an abstraction layer hooked into a unified data model for a multi-tenant computing platform. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2402, a multi-tenant computing platform (e.g., metadata-driven cloud-based platform 102) is deployed. The multi-tenant platform can include a plurality of different data structures, and each tenant may be associated with a respective subset of the plurality of different data structures. The multi-tenant computing platform can be in communication with a plurality of different back-end service providers (e.g., AWS, Azure) that each provide respective storage services and/or other back-end services for the tenants of the multi-tenant computing platform.

In module 2404, the multi-tenant computing platform obtains and/or accesses a unified data model (e.g., unified data model layer 1906) for the multi-tenant computing platform. The unified data model may provide, for each tenant of the multi-tenant computing platform, a respective logical view of the respective subset of data structures associated with that tenant.

In module 2406, the multi-tenant computing platform provides an abstraction layer. The abstraction layer maps respective attributes of each back-end service provider to corresponding attributes of the unified data model.

In module 2408, the abstraction layer selects a first storage scheme of a first back-end service provider of the plurality of different back-end service providers for a particular tenant.

In module 2410, a computing system (e.g., client system 1904 and/or metadata-drive cloud-based platform 102) receives, from the particular tenant, a first input.

In module 2412, the abstraction layer translates, responsive to the first input and based on the mapping between the respective attributes of the first back-end service provider (e.g., AWS) to the corresponding attributes of the unified data model, the first input to a first set of storage instructions native to the first back-end service provider. An execution of the first set of storage instructions may cause a first resulting logical view of the respective data structures of the particular tenant.

In module 2414, the abstraction layer seamlessly and dynamically switches the particular tenant from the first storage scheme to a second storage scheme of a second back-end service provider (e.g., Azure) of the plurality of different back-end service providers (e.g., without notifying the particular tenant).

In module 2416, the computing system receives, from the particular tenant, a second input, wherein the second input is the same as the first input (e.g., the two inputs are identical).

In module 2418, the abstraction layer translates, responsive to the second input and based on the mapping between the respective attributes of the second back-end service provider to the corresponding attributes of the unified data model, the second input to a second set of storage instructions native to the second back-end service provider. An execution of the second set of storage instructions may cause a second resulting logical view of the respective data structures of the particular tenant, and the second resulting logical view can be the same as the first logical view (e.g., the first and second logical views may be identical).

Figure 25:
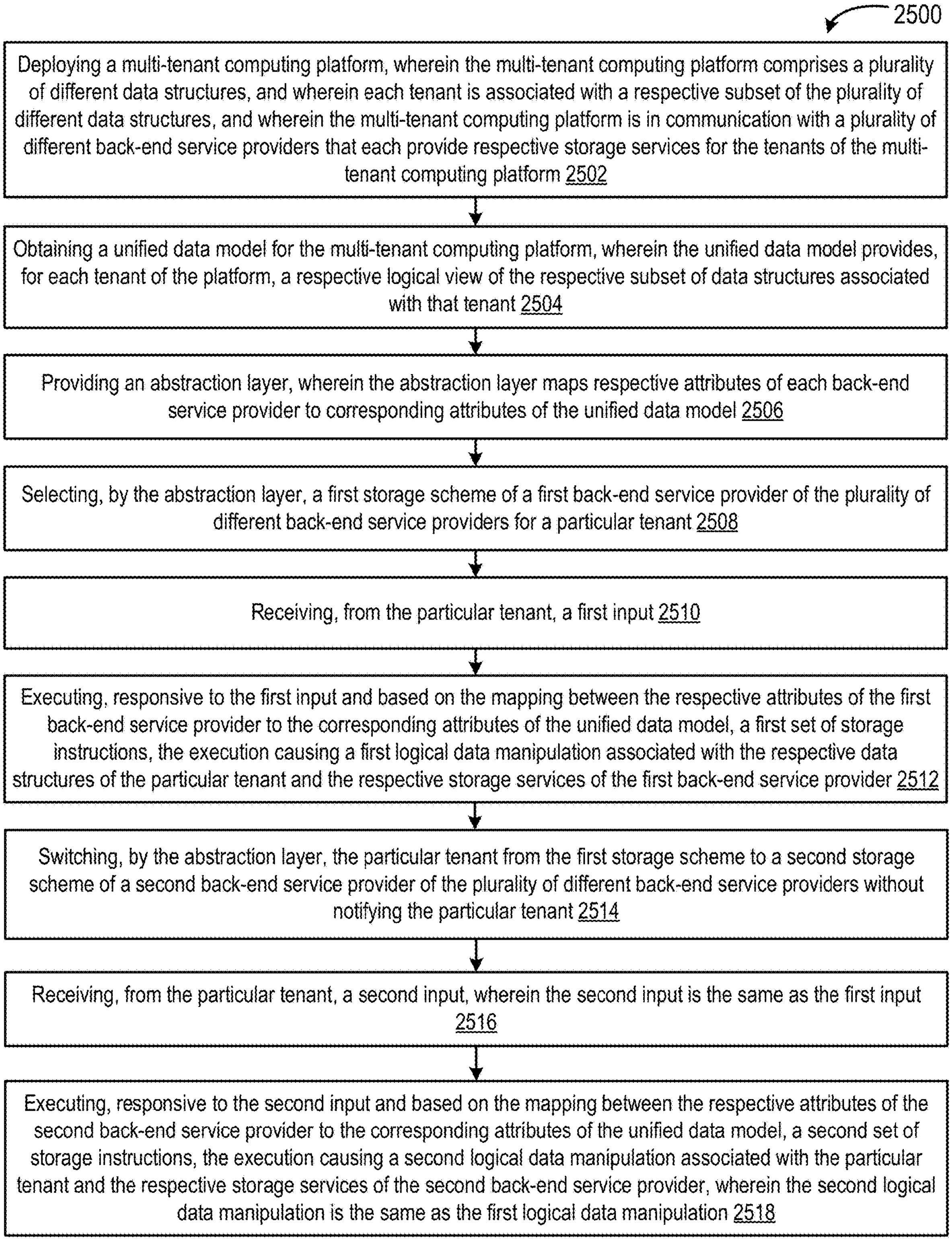
FIG. 25 depicts a flowchart of an example method of dynamic and seamless switching of cloud-native service providers using an abstraction layer hooked into a unified data model for a multi-tenant computing platform.

FIG. 25 depicts a flowchart 2500 of an example method of dynamic and seamless switching of cloud-native service providers using an abstraction layer hooked into a unified data model for a multi-tenant computing platform. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2502, a multi-tenant computing platform (e.g., metadata-driven cloud-based platform 102) is deployed. The multi-tenant computing platform can include a plurality of different data structures, and wherein each tenant is associated with a respective subset of the plurality of different data structures, and wherein the multi-tenant computing platform is in communication with a plurality of different back-end service providers that each provide respective storage services for the tenants of the multi-tenant computing platform.

In module 2504, the multi-tenant computing platform obtains and/or accesses a unified data model for the multi-tenant computing platform, wherein the unified data model provides, for each tenant of the multi-tenant computing platform, a respective logical view of the respective subset of data structures associated with that tenant.

In module 2506, the multi-tenant computing platform provides an abstraction layer. The abstraction layer maps respective attributes of each back-end service provider to corresponding attributes of the unified data model.

In module 2508, the abstraction layer selects a first storage scheme of a first back-end service provider of the plurality of different back-end service providers for a particular tenant.

In module 2510, the multi-tenant computing platform receives, from the particular tenant, a first input.

In module 2512, the multi-tenant computing platform executes, responsive to the first input and based on the mapping between the respective attributes of the first back-end service provider to the corresponding attributes of the unified data model, a first set of storage instructions, the execution causing a first logical data manipulation associated with the respective data structures of the particular tenant and the respective storage services of the first back-end service provider.

In module 2514, the abstraction layer switches the particular tenant from the first storage scheme to a second storage scheme of a second back-end service provider of the plurality of different back-end service providers without notifying the particular tenant.

In module 2516, the metadata-driven cloud-based platform receives, from the particular tenant, a second input, wherein the second input is the same as the first input.

In module 2516, the multi-tenant computing platform executes, responsive to the second input and based on the mapping between the respective attributes of the second back-end service provider to the corresponding attributes of the unified data model, a second set of storage instructions, the execution causing a second logical data manipulation associated with the particular tenant and the respective storage services of the second back-end service provider, wherein the second logical data manipulation is the same as the first logical data manipulation.

Figure 26:
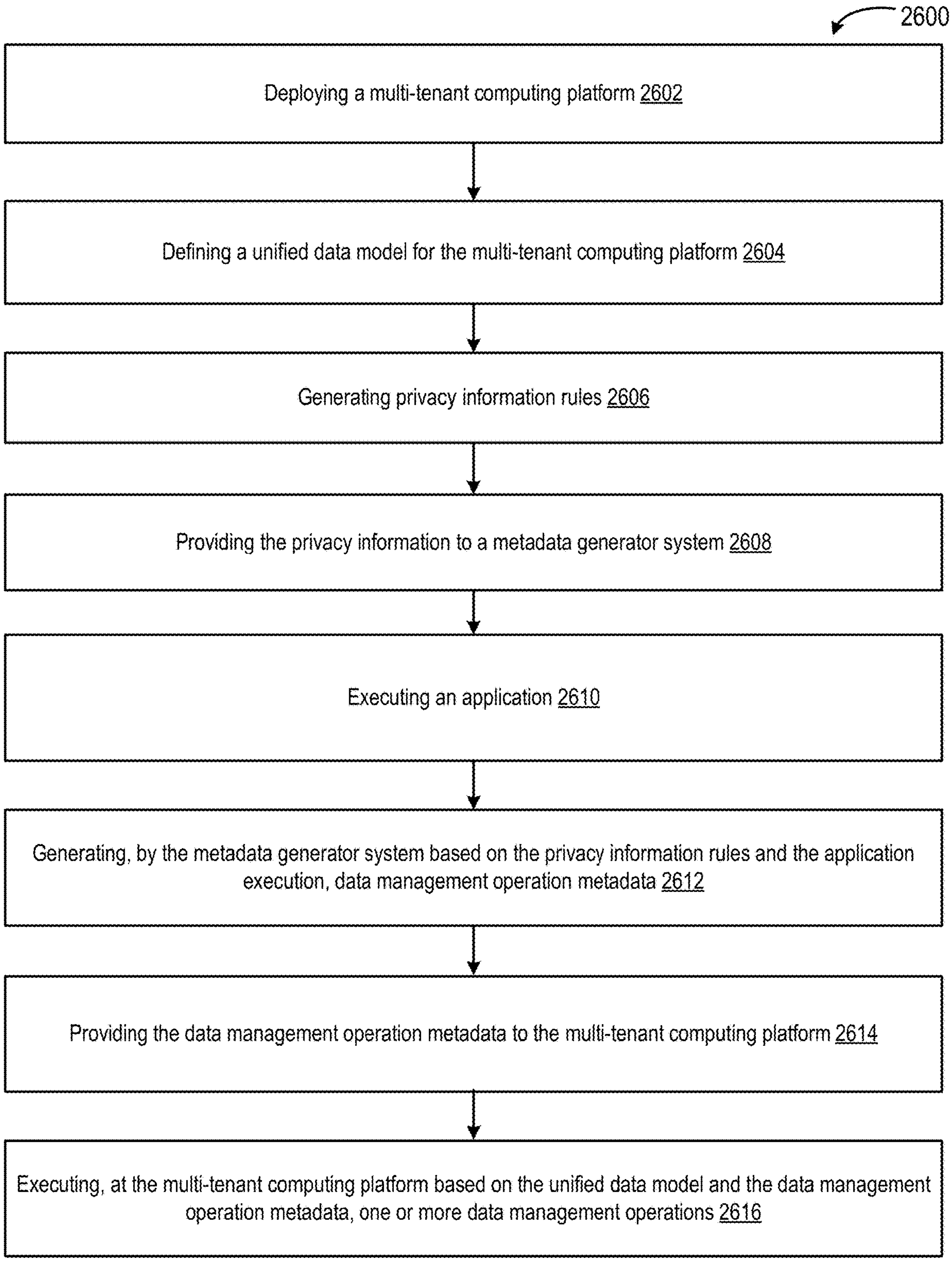
FIG. 26 depicts a flowchart of an example method of implementing secure metadata-driven data management.

FIG. 26 depicts a flowchart of an example method of implementing secure metadata-driven data management. In this and other flowcharts, flow diagrams, and/or sequence diagrams, the flowchart illustrates by way of example a sequence of modules. It should be understood the modules may be reorganized for parallel execution, or reordered, as applicable. Moreover, some modules that could have been included may have been removed to avoid providing too much information for the sake of clarity and some modules that were included could be removed but may have been included for the sake of illustrative clarity.

In module 2602, a multi-tenant computing platform (e.g., metadata-driven cloud-based platform 102) is deployed.

In module 2604, the multi-tenant computing platform defines a unified data model for the multi-tenant computing platform. The unified data model can normalize the different underlying data structures, applications, functions, and back-end services of the multi-tenant computing platform. The unified data model can also define relationships and dependencies between data and/or data types of the metadata-driven cloud-based platform. In some embodiments, at least a portion of the data and/or data types are indicated (e.g., marked or flagged) as private (e.g., as opposed to public or other non-private identifier) by the unified data model.

In module 2606, the multi-tenant computing platform generates privacy information rules.

In module 2608, the multi-tenant computing platform provides the privacy information to a metadata generator system (e.g., metadata generator system 1912).

In module 2610, a local system (e.g., local system 1910) executes an application.

In module 2612, the metadata generator system generates, based on the privacy information rules and the application execution, data management operation metadata.

In module 2614, the metadata generator system provides the data management operation metadata to the multi-tenant computing platform.

In module 2616, the metadata-driven cloud-based platform executes, at the multi-tenant computing platform based on the unified data model and the data management operation metadata, one or more data management operations.

The invention claimed is:

1. A system comprising:

one or more processors; and memory storing instructions that, when executed by the one or more processors, cause the system to perform:

deploying a multi-tenant computing platform, wherein the multi-tenant computing platform comprises a plurality of different data structures, and wherein each tenant of the multi-tenant computing platform is associated with a respective subset of the plurality of different data structures, and wherein the multi-tenant computing platform is in communication with a plurality of different cloud service providers that each provide respective storage services for the tenants of the multi-tenant computing platform;

defining a unified data model for the multi-tenant computing platform, wherein the unified data model provides, for each tenant of the multi-tenant computing platform, a logical view of the subset of data structures associated with that tenant;

configuring a metadata generator system based on the unified data model;

generating privacy information rules;

providing the privacy information rules to the metadata generator system;

executing an application by a local computing system in a local environment, wherein the application communicates with the multi-tenant computing platform outside the local environment;

generating, by the metadata generator system, data management operation metadata based on the unified data model, the privacy information rules, and the application execution, wherein the data management operation metadata describes operations and data involving private data that is used in the local computing environment by the application, and wherein the data management operation metadata comprises anonymized data, data types, field identifiers, private identifiers, public identifiers, natural language descriptions, and machine language descriptions;

providing the data management operation metadata to the multi-tenant computing platform rather than sending the private data to the multi-tenant computing platform;

executing, at the multi-tenant computing platform based on the unified data model and the data management operation metadata, one or more data management operations.

2. The system of claim 1, wherein the multi-tenant computing platform comprises a plurality of different underlying data structures, applications, functions, and back-end services.

3. The system of claim 2, wherein the unified data model normalizes the plurality of different underlying data structures, applications, functions, and back-end services of the multi-tenant computing platform.

4. The system of claim 3, wherein the unified data model defines relationships and dependencies between data types.

5. The system of claim 4, wherein at least a portion of the data types are indicated as private by the unified data model.

6. A method comprising:

deploying a multi-tenant computing platform, wherein the multi-tenant computing platform comprises a plurality of different data structures, and wherein each tenant of the multi-tenant computing platform is associated with a respective subset of the plurality of different data structures, and wherein the multi-tenant computing platform is in communication with a plurality of different cloud service providers that each provide respective storage services for the tenants of the multi-tenant computing platform;

defining a unified data model for the multi-tenant computing platform, wherein the unified data model provides, for each tenant of the multi-tenant computing platform, a logical view of the subset of data structures associated with that tenant;

configuring a metadata generator system based on the unified data model;

generating privacy information rules;

providing the privacy information rules to the metadata generator system;

executing an application by a local computing system in a local environment, wherein the application communicates with the multi-tenant computing platform outside the local environment;

generating, by the metadata generator system, data management operation data based on the unified data model, the privacy information rules, and the application execution, wherein the data management operation metadata describes operations and data involving private data that is used in the local computing environment by the application, and wherein the data management operation metadata comprises anonymized data, data types, field identifiers, private identifiers, public identifiers, natural language descriptions, and machine language descriptions;

providing the data management operation metadata to the multi-tenant computing platform rather than sending the private data to the multi-tenant computing platform;

executing, at the multi-tenant computing platform based on the unified data model and the data management operation metadata, one or more data management operations.

7. The method of claim 6, wherein the multi-tenant computing platform comprises a plurality of different underlying data structures, applications, functions, and back-end services.

8. The method of claim 7, wherein the unified data model normalizes the plurality of different underlying data structures, applications, functions, and back-end services of the multi-tenant computing platform.

9. The method of claim 8, wherein the unified data model defines relationships and dependencies between data types.

10. The method of claim 9, wherein at least a portion of the data types are indicated as private by the unified data model.

* * * * *